(12) United States Patent
Hamida et al.

(10) Patent No.: US 12,510,681 B2
(45) Date of Patent: *Dec. 30, 2025

(54) SYSTEM AND METHOD FOR FACIES-GUIDED SEISMIC IMAGE SUPER-RESOLUTION

(71) Applicant: KING FAHD UNIVERSITY OF PETROLEUM AND MINERALS, Dhahran (SA)

(72) Inventors: Adnan Hamida, Dhahran (SA); Motaz Alfarraj, Dhahran (SA); Salam A. Zummo, Dhahran (SA); Abdullatif A. Al-Shuhail, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 565 days.

This patent is subject to a terminal disclaimer.

(21) Appl. No.: 17/982,184

(22) Filed: Nov. 7, 2022

(65) Prior Publication Data

US 2024/0168188 A1 May 23, 2024

(51) Int. Cl.
*G01V 1/30* (2006.01)
*G01V 1/34* (2006.01)
(Continued)

(52) U.S. Cl.
CPC .............. *G01V 1/302* (2013.01); *G01V 1/345* (2013.01); *G01V 2210/641* (2013.01)

(58) Field of Classification Search
CPC ...... G01V 1/302; G01V 1/3435; G01V 1/641; G06T 3/4053; G06T 3/4046
(Continued)

(56) References Cited

U.S. PATENT DOCUMENTS

2018/0003839 A1* 1/2018 Lowell ................. G01V 1/302
2018/0106917 A1* 4/2018 Osypov ................. G01V 1/003
(Continued)

FOREIGN PATENT DOCUMENTS

CN 112799128 B 10/2021
CN 113703045 A 11/2021
WO WO2019153671 * 8/2018

OTHER PUBLICATIONS

Hung et al. "Real-Time Image Super-Resolution Using Recursive Depthwise Separable Convolution Network", Jun. 27, 2019. (Year: 2019).*

(Continued)

*Primary Examiner* — Michael P Nghiem
(74) *Attorney, Agent, or Firm* — Oblon, McClelland, Maier & Neustadt, L.L.P.

(57) ABSTRACT

A facies classification apparatus and method of training the apparatus is provided for seismic image super-resolution. The apparatus includes an input for receiving a low resolution seismic images extracted from a seismic volume and a feature extraction section to extract features from the low resolution images. A non-linear feature mapping section generates feature maps using a self-calibrated block with pixel attention having a plurality of Depthwise Separable Convolution (DSC) layers. A late upsampling section combines at least one DSC layer that upsamples the feature maps to a predetermined dimension. An output provides approximate upsampled super-resolution seismic images that correspond to the low resolution seismic images, with a desired scale of at least two times the low resolution seismic image. A pretrained facies classifier classifies facies in the seismic volume based on the approximate upsampled super-resolution seismic images to obtain class labels.

8 Claims, 22 Drawing Sheets

(51) Int. Cl.
*G06T 3/4046* (2024.01)
*G06T 3/4053* (2024.01)

(58) Field of Classification Search
USPC .......................................................... 702/16
See application file for complete search history.

(56) References Cited

U.S. PATENT DOCUMENTS

| | | |
|---|---|---|
| 2021/0255347 A1 | 8/2021 | Palmer et al. |
| 2022/0146705 A1* | 5/2022 | Gkortsas ................ G01V 11/00 |
| 2023/0260090 A1* | 8/2023 | De Souza Fioriti ...... G06T 5/73 |
| | | 382/275 |
| 2024/0161235 A1* | 5/2024 | Alfarraj ................ G06T 3/4046 |

OTHER PUBLICATIONS

Zou et al. "Self-Calibrated Efficient Transformer for Lightweight Super-Resolution", Apr. 19, 2022. (Year: 2022).*
Busson, et al. ; Seismic Shot Gather Noise Localization Using a Multi-Scale Feature-Fusion-Based Neural Network ; Department of Informatics, Pontifical Catholic University of Rio de Janeiro, Leopoldo Americo Miguez do Mello Research and Development Center (Cenpes) ; May 7, 2020 ; 5 Pages.

* cited by examiner

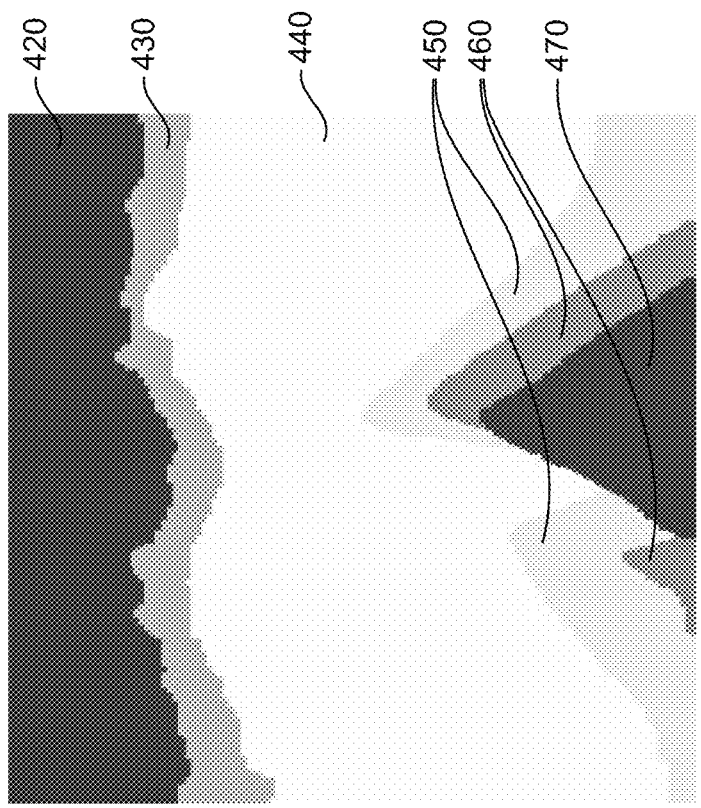
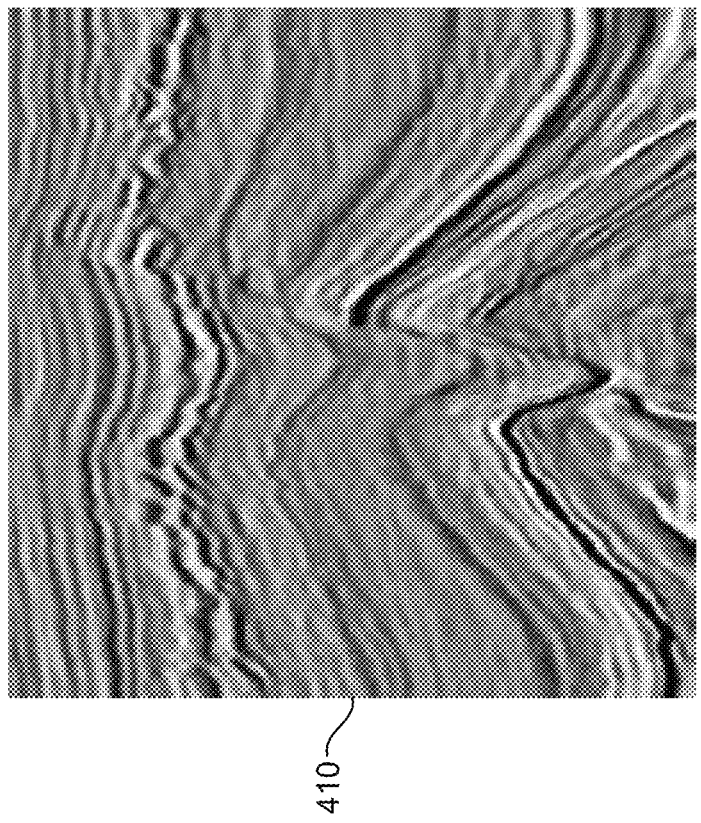
FIG. 4B
FIG. 4A

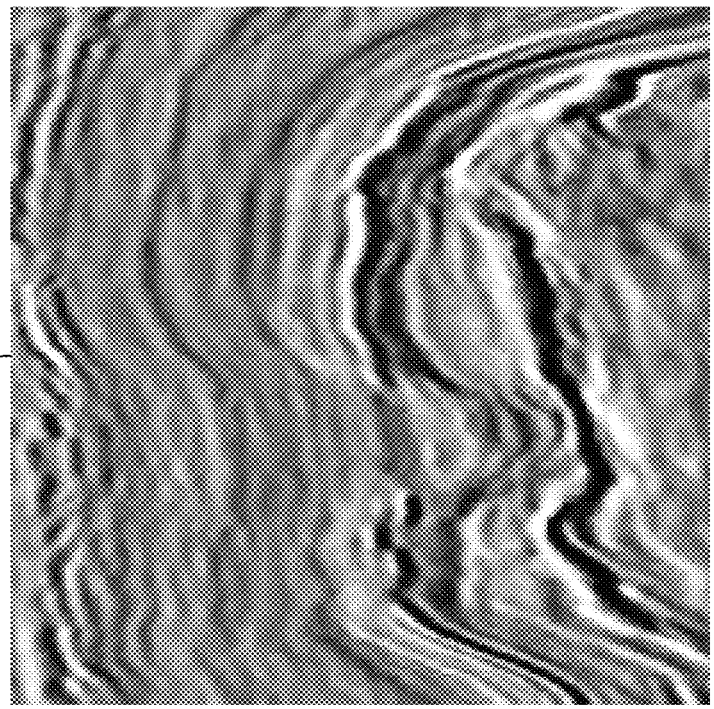
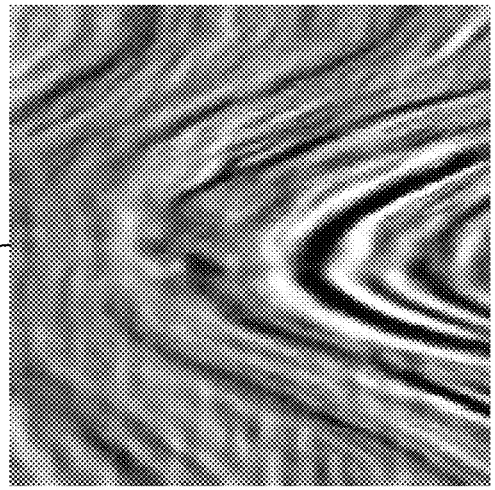
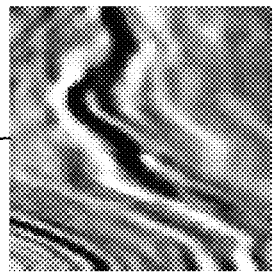
FIG. 5A  72 x 72
FIG. 5B  132 x 132
FIG. 5C  192 x 192

SYSTEM AND METHOD FOR FACIES-GUIDED SEISMIC IMAGE SUPER-RESOLUTION

CROSS-REFERENCE TO RELATED APPLICATIONS

This application is related to non-provisional application Docket No. 542730US filed concurrently herewith, the entire contents of which are incorporated herein by reference.

STATEMENT OF ACKNOWLEDGEMENT

The authors would like to acknowledge the support and facilities provided by the Electrical Engineering Department and the workstation access provided by SDAIA-KFUPM Joint Research Center for Artificial Intelligence at King Fahd University of Petroleum & Minerals (KFUPM), Dhahran, Saudi Arabia.

BACKGROUND

Technical Field

The present disclosure is directed to seismic image reconstruction from low-resolution images migrated from a seismic volume, and in particular, training a self-calibrated convolution neural network having a pixel attention block using a facie classification loss to guide the self-calibrated convolution in an upsampling stage.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In oil and gas exploration, a seismic survey is an important tool for exploring subsurface mineral deposits, volcanic monitoring, landslide monitoring, monitoring of glaciers, and underground tomography. The seismic survey is performed by sending seismic waves into the deep subsurface of the Earth and recording the reflected and refracted waves as seismic data. In the seismic survey, interpretation is a process that involves analysis of the seismic data to identify and locate various subsurface structures (e.g., horizons, faults, geo-bodies, etc.) in a geologic environment.

Recent advances in the field of seismic acquisition and processing intend to provide high-resolution (HR) seismic data either by increasing the density of the sensors in a given survey or by using more advanced sensors that capture both low- and high-frequency bands of the seismic waves. Both methods rely in part on the seismic surveys' financial, computational, and memory costs. Image super-resolution (SR) techniques are employed to enhance the resolution of the available seismic data, avoiding the need for new surveys. Image SR is an image processing approach for reconstructing an HR image reconstructed from a low-resolution (LR) image. Presently, conventional systems perform super-resolution (SR) by employing operations such as interpolations, contour features, and statistical image priors. However, these systems face two main issues: an unclear definition of mapping for developing between the LR image and the HR image, and inefficiency in establishing a complex high-dimensional map from raw data of large size.

Convolutional neural networks (CNNs) have provided a significant improvement in SR accuracy, referred to as "SRCNNs" (i.e., super-resolution convolutional neural networks). However, SRCNN's accuracy is limited by a small structure, e.g., 3 layers, and/or a small context reception field. To overcome this limitation, the size of SRCNNs is increased, resulting in the use of a large number of parameters and non-execution of the SRCNNs in real-time. Due to the large size of the SRCNNs, it becomes very difficult to determine appropriate training settings, i.e., learning rate, weight initialization, and weight decay.

There is a wide variety of complex and sophisticated models that improve the quality of the reconstructed image by increasing the depth and complexity of the models. Recently, a light SR model was introduced, that uses a recursive depth-wise separable convolution (DSC). However, in the light SR model, the required number of multiply-accumulate operations (MACs) is increased due to a recursive operation. An SSNet-M model was also proposed, with fewer layers and without the recursive block to reduce parameters, and using MACs for real-time SR. However, SSNet-M used the super-sampling technique, which does not scale well when the desired upscale factor increases.

Later, a generative adversarial network (GAN)-based model with four convolutional layers was also used in which an input LR image is generated using a low-pass filter. The model was evaluated by judging an image quality, and by examining the frequency content of the output (HR data). The HR data is obtained using an adaptive bandwidth extension in the continuous wavelet transform domain for both training and testing datasets. The trained model is tested and compared with the HR data obtained using a bandwidth extension method. Due to unstable training and unsupervised learning method, GAN was hard to train and generate output.

Accordingly, it is one object of the present disclosure to provide an apparatus, method and system that perform image super-resolution in real time, and in particular, train a deep learning convolutional neural network for seismic image super-resolution using a loss function that incorporates facies information. Training data is augmented by using a variable patch size.

SUMMARY

An aspect of the present disclosure is a facies classification apparatus, that can include processor circuitry for a combination multi-core CPU and machine learning engine configured with an input for receiving a low resolution seismic images extracted from a seismic volume; a feature extraction section to extract features from the low resolution images; a non-linear feature mapping section connected to the feature extraction section generating feature maps using a self-calibrated block with pixel attention having a plurality of Depthwise Separable Convolution (DSC) layers; a late upsampling section combines at least one DSC layer that upsamples the feature maps to a predetermined dimension; an output, connected to the late upsampling section, for outputting approximate upsampled super-resolution seismic images that correspond to the low resolution seismic images, with a desired scale of at least two times the low resolution seismic image; a facies classifier for classifying facies in the seismic volume based on the approximate upsampled super-resolution seismic images to obtain one or more class labels;

and a display to display the output approximate upsampled super-resolution seismic images and the one or more class labels.

A further aspect is a method of training an image super-resolution apparatus for facies classification, the apparatus can include processor circuitry for a combination multi-core CPU and machine learning engine configured with an input, a feature extraction section, a non-linear feature mapping section, a late upsampling section, and an output, the method including receiving, via the input, a low resolution seismic images extracted from a seismic volume; extracting, via the feature extraction section, features from the low resolution images; generating feature maps, via the non-linear feature mapping section connected to the feature extraction section, using a self-calibrated block with pixel attention having a plurality of Depthwise Separable Convolution (DSC) layers; upsampling the feature maps to a predetermined dimension to obtain an output, via the late upsampling section that includes at least one DSC layer; outputting, via the output, connected to the late upsampling section, an approximate upsampled super-resolution seismic image that corresponds to the low resolution seismic images, with a desired scale of at least two times the respective low resolution seismic image; classifying facies in the seismic volume, via a facies classifier, based on the approximate upsampled super-resolution seismic images to obtain one or more class labels; and training the image super resolution apparatus using a total loss function calculated as a linear combination of a SR loss function and a facies classification loss function, that incorporates facies information.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4A illustrates an example of seismic image extracted from a F3 block, according to aspects of the present disclosure;

FIG. 4B illustrates an example of facies label corresponding to an extracted seismic image, according to aspects of the present disclosure;

FIG. 5A illustrates an example of extracted patch sample having a size of 72×72, according to aspects of the present disclosure;

FIG. 5B illustrates an example of extracted patch sample having a size of 132×132, according to aspects of the present disclosure;

FIG. 5C illustrates an example of extracted patch sample having a size of 192×192, according to aspects of the present disclosure;

DETAILED DESCRIPTION

Figure 1A:
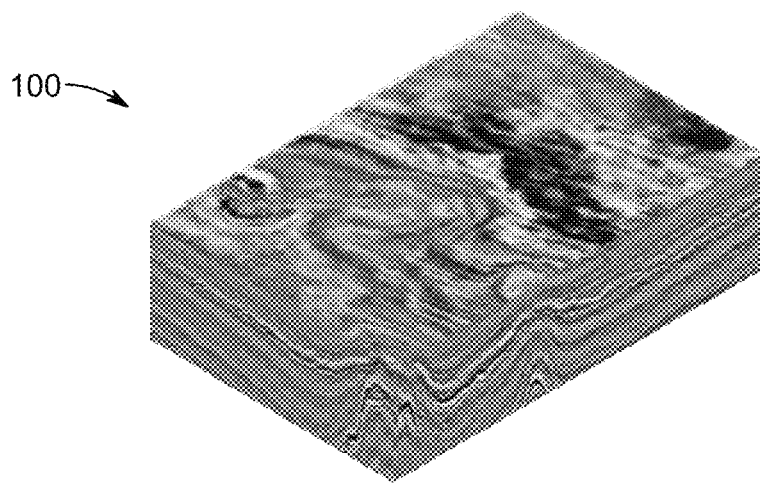
FIG. 1A illustrates a 3D seismic volume after seismic migration, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Seismic field data usually suffers from low-resolution (LR) image quality. Presently, high-resolution (HR) seismic data acquisitions are obtained either in high-density seismic surveys or by capturing high- and low-frequency bands in broadband seismic surveys. However, both methods increase the financial, computational, and memory overhead required in oil and gas exploration. Moreover, to improve the resolution of already acquired seismic field data, another survey would be needed, and this is a time-consuming and high-cost approach.

Aspects of this disclosure are directed to a seismic image super-resolution apparatus and a method of training the seismic image super-resolution apparatus for facies classification. The disclosure discloses an implementation of a Deep Learning-based Convolutional Neural Network (CNN) super-resolution (SR) model for an image to increase the resolution of seismic images. Further, the disclosed apparatus is configured to employ a number of image analysis algorithms that utilize human visual system (HVS) characteristics and objective and subjective image quality assessment (IQA) to evaluate the SR model. Furthermore, the disclosed SR model is configured to perform facies classification. The output from the SR model is used as an input to a facies classifier. Also, a facies classification loss is used to guide the SR model when upsampling the seismic image.

In various aspects of the disclosure, non-limiting definitions of one or more terms that will be used in the document are provided below.

The term "Image super-resolution" is a process for generating or recovering a high resolution (HR) image from a single low resolution (LR) image. The input is a blurred or LR image. The output is a high resolution image.

The term "facies classification" is defined as a process to classify facies (uniform sedimentary bodies of rock). The facies are distinguishable enough from each other in terms of physical characteristics (e.g. sedimentary structure, grain sizes) deposited under the action of a relatively uniform hydrodynamic regime in a given depositional setting.

The term "seismic migration" is defined as a set of techniques for transforming recorded (elastic-wave) seismic reflection data into an image of reflecting boundaries in the earth's interior.

Facies classes may be specific physical characteristics that can be grouped together. One grouping based on lithostratigraphic units has been made for the continental shelf of the North Sea. The groups include: Upper North Sea, Lower and Middle North Sea, Chalk, Rijnland, Schieland, Altena, Lower and Upper Germanic Trias, Zechstein, Upper and Lower Rotliegend, and Limburg.

Seismic data acquisition is an important task in oil and gas exploration and production. Seismic surveys are conducted for the purpose of acquiring seismic data by laying a large 2D array of sensors onshore or offshore. The array of sensors either includes geophones for onshore surveys or hydrophones for offshore surveys. A vibration source generates seismic waves that propagate through the earth's subsurface and reflect back to the surface. The reflected waves are then sensed and recorded by the sensors, forming raw seismic reflection data. The raw seismic reflection data is processed under various processing steps to generate refined seismic data. The last processing step is a seismic migration that forms a seismic volume to represent the earth's subsurface.

The North Sea (N. S.) is one of the richest areas full of hydrocarbon (oil and gas) deposits. The N.S. is located offshore north of the Netherlands. The area is divided into smaller areas denoted by letters of the alphabet, and each area is subdivided into smaller blocks denoted by numbers. A F3 block is one of these smaller areas, which has a rectangular shape of dimensions 16 km×24 km. In 1987, a 3D seismic survey was carried out in the F3 block including numerous boreholes. The F3 block is the most extensively studied block, available publicly. The original data contains 651 inlines, 951 crosslines and is recorded with 463 samples/trace.

FIG. 1A illustrates a 3D seismic volume 100 after the seismic migration, according to aspects of the present disclosure. In an aspect, during experimentation, the present disclosure uses an open-source geologic model (a fully annotated 3D model) of the Netherlands F3 block. In an aspect, the F3 block is a block in the Dutch sector of the North Sea. The 3D geologic model is based on the 3D seismic data in addition to 26 well logs, and it is based on the geology of the region.

Figure 1B:
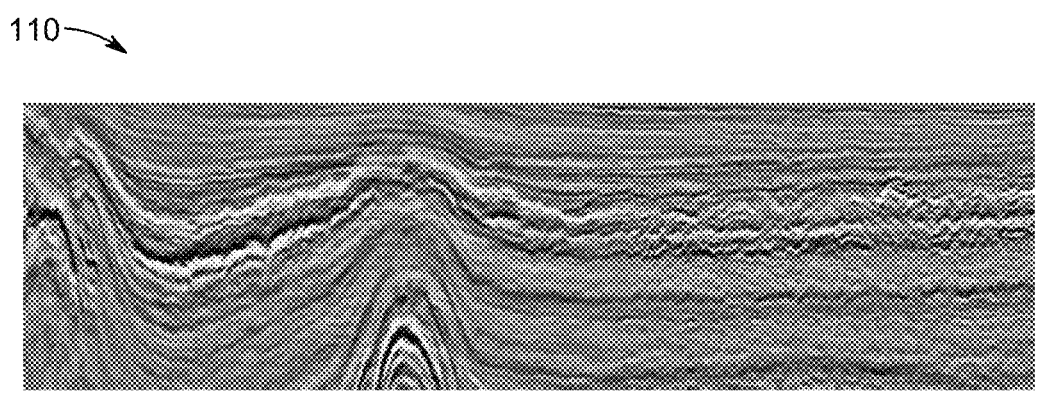
FIG. 1B illustrates a 2D seismic image obtained from the 3D seismic volume, according to aspects of the present disclosure.

FIG. 1B illustrates a 2D seismic image 110 obtained from the 3D seismic volume 100. For example, a plurality of 2D seismic images can be obtained from the 3D seismic volume 100 by taking inline or crossline slices of the 3D seismic volume 100. Depending on the seismic migration process, the vertical dimension of the seismic volume is either expressed in time or depth. As is known, several time-to-depth conversion methods are used. For example, as illustrated in FIG. 1A, the 3D seismic volume 100 is a converted seismic volume 100 that has a vertical dimension in depth. After the seismic volume is migrated, geological information is extracted, and this is known as seismic interpretation. However, due to the limited number of physical sensors used in a geo-survey and the limitations of the physical sensors, some of the recorded seismic field data suffers from low-resolution (LR) image quality. The LR image hinders and introduces challenges in the seismic interpretation stage of oil and gas exploration and production.

Figure 2:
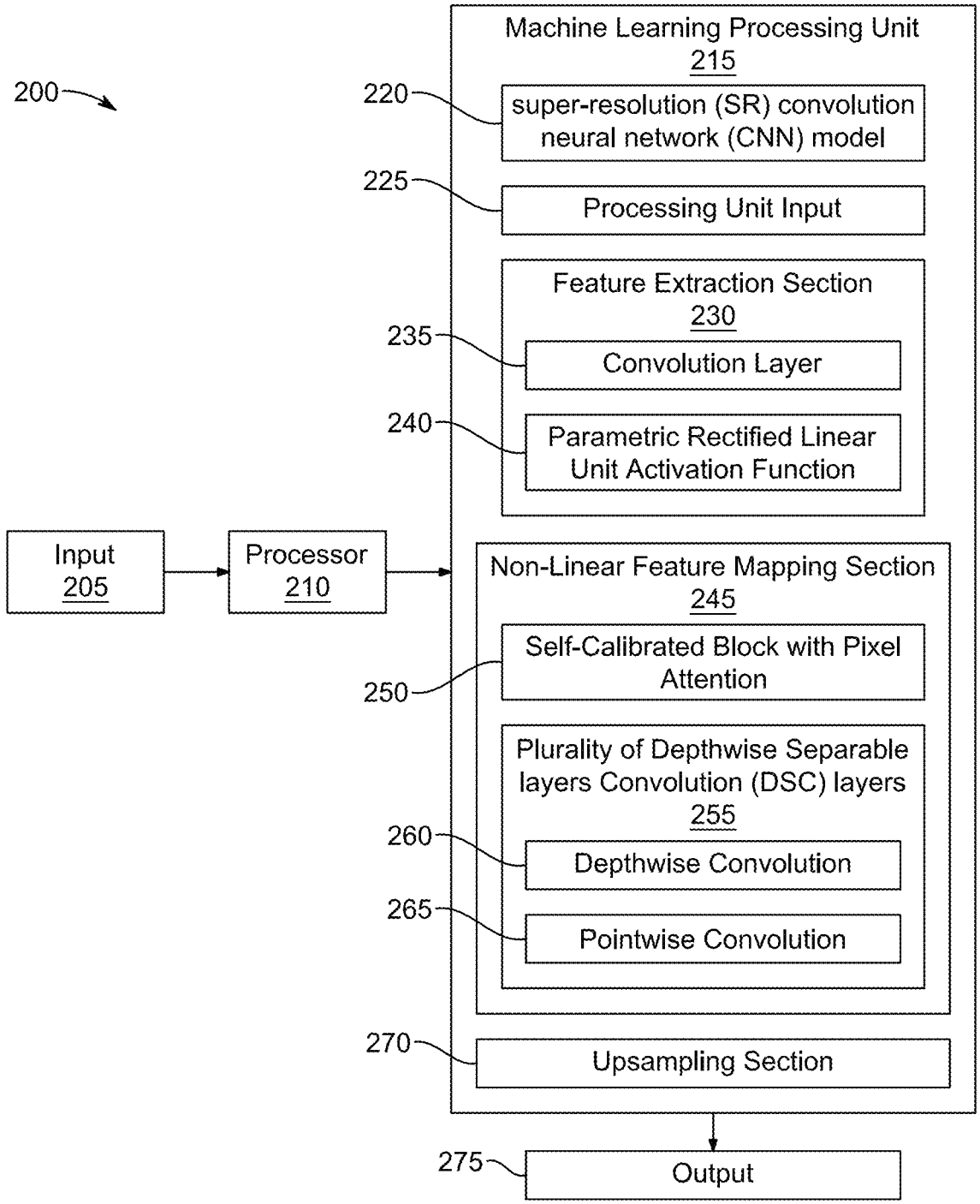
FIG. 2 illustrates a block diagram of a seismic image super-resolution apparatus, according to aspects of the present disclosure.

FIG. 2 illustrates a block diagram of a seismic image super-resolution apparatus 200, (hereinafter referred to as the "apparatus 200") according to aspects of the present disclosure. Referring to FIG. 2, the apparatus 200 includes an input 205, a processor 210, a machine learning processing unit 215, and an output 275.

The input 205 (also referred to as input unit 205) is configured to receive a low-resolution (LR) seismic image extracted from a seismic volume. In an aspect, the input unit 205 receives the LR seismic image from a computing device. In one embodiment, the input unit 205 may be any computing device, such as a desktop computer, a laptop, a tablet computer, a smartphone, a mobile device, an image sensor, a Personal Digital Assistant (PDA), or any other computing device that has processing capabilities. In some aspects, the input unit 205 is configured to receive the LR seismic image from the plurality of sensors deployed for conducting the survey. In an aspect, the input unit 205 is configured to receive an input such as a photo, an image, a video, or image information. In some embodiments, the input unit 205 is configured to pre-process the received LR seismic image by employing various operations such as encoding, image down-scaling, splitting into single full-resolution frames, uncompressing, compressing, and grouping frames.

The processor 210 is incorporated with the machine learning processing unit 215. In an operative aspect, the processor 210 is configured to receive the LR seismic image from the input unit 205 via a data communication network. After receiving the LR seismic image from the input unit 205, the processor 210 is configured to process the received seismic image to generate a processed image. In an aspect, the processing of the seismic image may include image augmentation, image re-sizing, normalization, and format conversion. In an aspect, the processor 210 is commutatively coupled to a memory that is configured to store a predefined set of processing the images. In an aspect, the memory is configured to store a Machine Learning (ML) model and a training set for training the ML model. The stored program instructions include a program that implements a method for using the ML method of training an image super-resolution apparatus for facies classification may implement other embodiments described in this specification. In an aspect, the ML model is configured to auto-update by adding the received seismic images from the input unit 205. The memory is configured to store processed images. The memory may include any computer-readable medium known in the art including, for example, volatile memory, such as Static Random Access Memory (SRAM) and Dynamic Random Access Memory (DRAM) and/or non-volatile memory, such as Read Only Memory (ROM), erasable programmable ROM, flash memories, hard disks, optical disks, and magnetic tapes.

The processor 210 is configured to cooperate with the memory and to fetch and execute computer-readable instructions stored in the memory. According to an aspect of the present disclosure, the processor 210 may be implemented as one or more microprocessors, microcomputers, micro-controllers, digital signal processors, central processing units, state machines, logic circuitries, and/or any devices that manipulate signals based on operational instructions.

In an operative aspect, the machine learning processing unit 215 is configured to employ a super-resolution (SR) convolution neural network (CNN) model 220. The machine learning processing unit 215 includes a processing unit input 225, a feature extraction section 230, a non-linear feature mapping section 245 and an upsampling section 270.

In an aspect, the SR-CNN model 220 is a type of neural network that is configured to process images. The SR-CNN model 220 may be used to input an LR image and output a high-resolution (HR) image. For example, a SR-CNN model 220 can be used to employ a super-resolution facies loss that is configured to provide facies information to the SR-CNN model 220 during upsampling of the LR image to generate the HR image. In an aspect, the SR-CNN model 220 has multiple layers such as a convolution layer, a rectified linear unit ("ReLU") layer, a pooling layer, a fully connected ("FC") layer, and so on.

The processing unit input 225 is configured to receive the LR seismic image from the input unit 205. In one embodiment, the processing unit input 225 is configured to receive the processed image from the processor 210.

The feature extraction section 230 is co-operatively coupled with the processing unit input 225 and receives the LR seismic image from the processing unit input 225. In an aspect, the feature extraction section 230 includes a convolution layer 235 and a parametric rectified linear unit activation function 240. The feature extraction section 230 is configured to extract a plurality of features from the received LR seismic image. In an aspect, the plurality of features may include, for example, RGB colors (that is, red, green, and blue colors), surface normals (in the x, y, and z directions), depth, albedo (reflectivity), their corresponding variances, and the like. In an operative aspect, the feature extraction section 230 may include a plurality of convolutional layers and a pair of pooling layers. The plurality of convolutional layers include a series of digital filters to perform the convolution operation on the received LR seismic image. The convolution layer 235 is configured to extract the various features from the input images. In the convolution layer 235, the mathematical operation of convolution is performed between the input LR seismic image and a filter of a particular size M×M. By sliding the filter over the input LR seismic image, the dot product is taken between the filter and the parts of the input LR seismic image with respect to the size of the filter (M×M). The output is termed as a feature map which gives us information about the image such as the corners and edges. In an aspect, the generated feature map is further fed to other layers to learn several other features of the input image.

In an operative aspect, the convolution layer 235 is followed by a pooling layer. The objective of the pooling layer is to decrease the size of the convolved feature map to reduce the computational costs. The pooling layer decreases the connections between layers and independently operates on each feature map. The pooling layer first transforms neighboring pixels into a single pixel and then decreases the image dimension. The pooling layer is a dimensionality reduction layer and decides the threshold. In one embodiment, the operations of the convolution layers and pooling layers are based on a two-dimensional plane. During back-propagation, a number of parameters are required to be adjusted, which in turn minimizes the connections within neural network architecture. In an aspect, the plurality of features are utilized by the neural network for classification. The neural network performs classification on basis of the image features and produces the output.

The parametric rectified linear unit activation function 240 is configured to analyze an interaction effect in the SR-CNN model 220. The interactive effect occurs when one variable A affects a prediction differently depending on the value of B. In an aspect, the parametric rectified linear unit activation function 240 decide which information of the SR-CNN model 220 should fire in the forward direction and which ones should not at the end of the network. In one embodiment, the present apparatus 200 may be configured to employ several commonly used activation functions such as the ReLU, Softmax, tan H and the Sigmoid functions.

The non-linear feature mapping section 245 is configured to receive the generated features (feature map) from the feature extraction section 230. The non-linear feature mapping section 245 is configured to represent the extracted plurality of features along with their relevancy, therefore excluding the irrelevant features. The non-linear feature mapping section 245 is configured to map the extracted features according to their relevancy to find out the correlation between the plurality of features and generates a set of relevant features. The non-linear feature mapping section 245 includes a self-calibrated block with pixel attention (ESC-PA) 250. The ESC-PA 250 includes a plurality of convolution layers. For example, the convolution layers are Depthwise Separable Convolution (DSC) layers 255. The ESC-PA 250 is configured to improve the representation of the generated set of relevant features. In an operative aspect, the ESC-PA 250 of the non-linear feature mapping section 245 includes an upper convolution and a lower convolution. The upper convolution is employed for high-level feature manipulation. The lower convolution is configured to conserve original image information. In one embodiment, each of the upper convolution and the lower convolution has depthwise separable convolutional (DSC) layers.

Further, the non-linear feature mapping section 245 includes a parametric rectified linear unit (PReLU) activation function for each DSC layer. In an aspect, the PReLU activation function is configured to function as an activation function. In a convolutional neural network, the activation function of a node defines the output of that node given for an input or set of inputs. The activation function is responsible for transforming a summed weighted input from a node into the activation of the node and defines the specific output or "activation" of the node. In an aspect, the PReLU includes a parameter that is learned.

The plurality of DSC layers 255 is configured to reduce the number of computations that are being performed in each convolutional layer. In an aspect, the plurality of DSC layers 255 are 3×3 DSC layers. For example, the convolutional neural network (CNN) architecture has user-adjustable parameters that include one or more of: a number of the plurality of depthwise separable convolution layers, and a respective number of filters included in the depthwise convolution layer of each of the plurality of DSC layers 255.

In a structural aspect, each of the plurality of DSC layers 255 includes a depthwise convolution 260 and a pointwise convolution 265. The depthwise convolution 260 applies an element-wise product to a convolution kernel and to each channel of input features independently. In the depthwise convolution 260, each convolution kernel is applied to a single channel of the input and not all the input channels at once. Hence, each convolution kernel is of shape (w*h*1) since the convolution kernel would be applied to the single channel. The number of convolution kernels is equal to the number of input channels. For a W*H*3 size input, there are 3 (three) separate w*h*1 kernels, and each convolution kernel is applied to a single channel of the input. Thus the output includes the same number of channels as the input.

The pointwise convolution 265 includes a kernel that iterates through every point. The pointwise convolution 265 is configured to change the number of channels, as it is required to increase the number of channels such that each layer has as an output as the CNN grows deeper. In an operative aspect, the process of the DSC layers 255 may be described in two steps. In a first step of the depthwise convolution, during the depthwise convolution 260, there is one (1) convolution kernel for each input channel and convolution kernel is applied to the input. The resultant output of the depthwise convolution 260 is a feature map block with the same number of channels as the input. In a second step of the pointwise convolution, there are several 1×1 convolution kernels, and these convolution kernels combined with the intermediate feature map block. In an aspect, the number of kernels can be chosen according to the number of output channels.

The upsampling section 270 includes a connection that upsamples to a desired scale (super-resolution image). In an aspect, the connection has at least one DSC layer and a global skip connection. The upsampling section 270 is configured to combine at least one DSC layer and the global skip connection that upsamples (a process of expansion and filtering (interpolation)) to the desired scale. In one embodiment, the upsampling section 270 is configured to increase the spatial area by introducing more pixels in the feature map before applying convolutions. In an aspect, the upsampling section 270 also includes a pixel attention block having a convolution layer to attain a 3D matrix of attention maps. For instance, the upsampling section 270 may be constructed using bilinear or longer filters.

The global skip connection is configured to upsample the low resolution image to a desired dimension using bicubic interpolation. The bicubic interpolation is an extension of cubic interpolation for interpolating data points on a two-dimensional regular grid. The bicubic interpolation is configured to sharpen and enlarge a digital image. The bicubic interpolation is added to the output to produce the super-resolution image.

The output 275 (also referred to as output unit 275) is communicatively coupled to the upsampling section 270 and receives the produced super-resolution image from the upsampling section 270. The output unit 275 is configured to display an approximate upsampled super-resolution seismic image that corresponds to the low resolution seismic image with a desired scale. In one embodiment, the desired scale is at least two times the low resolution seismic image. In an aspect, the output unit 275 is selected from a group of display units consisting of a television, a digital billboard, a computer monitor, a laptop monitor, a game console, a cell phone with a display, a camera display, a personal digital assistant (PDA), and a smartphone with a display. In one embodiment, the output unit 275 is configured to transmit directly to a display or may be stored for viewing on a display on a local or remote storage device, or forwarded to a remote node for storage or viewing as required.

A relationship between a HR image $I^{HR}$, and an LR image $I^{LR}$ is given as:

$$I^{LR} = (I^{HR} \otimes h) \downarrow_r + n \quad (1)$$

where $\otimes$ is the convolution operator, h is a blurring antialiasing kernel, $\downarrow$ is the down-sampling operator, r is the downsampling factor, n is Additive White Gaussian Noise (AWGN) with noise level $\sigma$, and $I^{LR}$ is the LR image.

The objective of the present apparatus 200 is to obtain a super-resolution image $I^{SR}$ from $I^{LR}$ which is as close as possible to $I^{HR}$. The existing super-resolution techniques suffer from an ill-posed problem, referred to as a singular (singularity) problem, meaning that there is many-to-one mapping between $I^{LR}$ and $I^{HR}$. This ill-posed problem can be observed from the aspect of having limited input data that is used to predict numerous pixel intensities. To alleviate the singularity problem, the present disclosure is configured to utilize additional (internal or external) information such as prior's statistical data in reconstruction-based methods, or exemplar images in learning-based methods.

In an aspect, the kernel h, in equation (1), produces no additional blurring on $I^{LR}$ and $I^{LR}$. For example, the kernel h is assumed sharp. A downsampling operation is done using an anti-aliasing bicubic interpolation. For employing deep learning (DL) model, it is desirable to train the DL model to learn a mapping function between $I^{LR}$ and $I^{HR}$.

Figure 3:
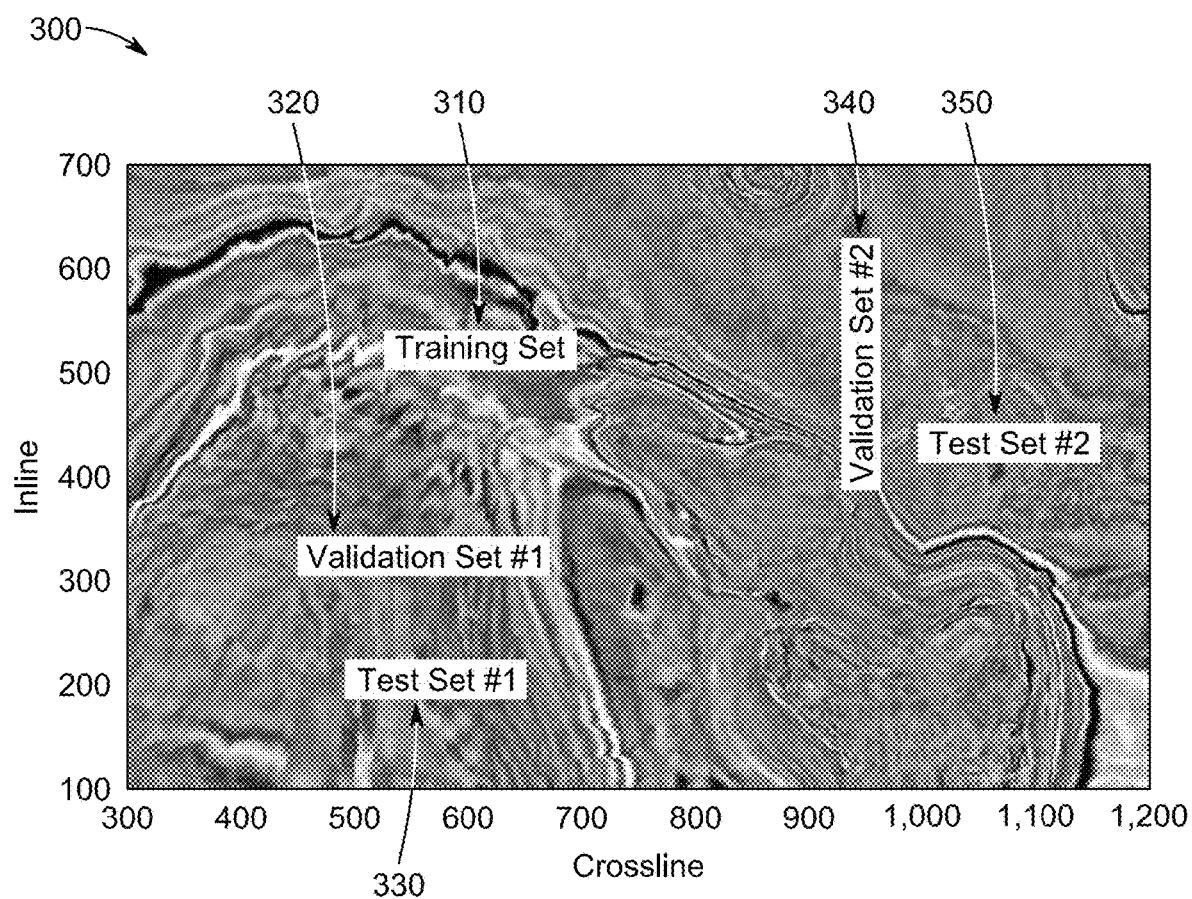
FIG. 3 illustrates partitioning of datasets (training set, validation set, and test set), according to aspects of the present disclosure.

FIG. 3 illustrates partitioning 300 of datasets (training set, validation set, and test set), according to aspects of the present disclosure. FIG. 3 shows a depth slice of the seismic volume 100 with the partitioning of datasets. In one embodiment, the present disclosure uses the F3 block. In one embodiment, the F3 block splits into a training set and a testing set. The data is converted from time to depth. For example, the notation $R^{a \times b \times c}$ denotes a seismic volume dataset with a inlines, b crosslines, and c depth slices. One element in a seismic volume dataset is referred to as a voxel. The total number of voxels in $R^{a \times b \times c}$ dataset are a×b×c. The available seismic volume $R^{601 \times 901 \times 255}$ covers inlines in the range [100, 700], crosslines in the range [300, 1200], and depth between [1005, 1877] meters of the seismic survey.

Seismic Volume Data Splits

The present disclosure is configured to utilize publicly available seismic volume (F3 block). For example, the available F3 data has one training Set and two test sets (a test set #1 330, a test set #2 350). The F3 data is divided into the training set 310 and two testing sets (330, 350) to minimize the correlation between the training set and the testing sets. The training set is further split into three sets: namely, a training set 310, a validation set #1 320, and a validation set

2 340. The validation sets (320, 340) are used during training to evaluate the ML model. The validation set #1 320 and the test set #1 330 are used for crossline seismic section evaluation, and the validation set #2 340 and the test set #2 350 are used for inline seismic section evaluation.

In one embodiment, the training set is of size $R^{351 \times 651 \times 255}$ covers inlines in the range [350, 700] and crosslines in the range [300, 950] and contains a total of 58, 267, 755 voxels. The validation set #1 is of size $R^{50 \times 651 \times 255}$ covers inlines in the range [300, 349] and crosslines in the range [300, 950] and contains a total of 8,300,250 voxels. The validation set #2 is of size $R^{401 \times 50 \times 255}$ covers inlines in the range [300, 700] and crosslines in the range [951, 1000] and contains a total of 5,112,750 voxels. In one embodiment, the test Set #1 is of size $R^{200 \times 701 \times 255}$ covers inlines in the range [100, 299] and crosslines in the range [300, 1000] and contains a total of 35,751,000 voxels.

In one embodiment, the test Set #2 is of size $R6^{01 \times 200 \times 255}$, covers inlines in the range [100, 700] and crosslines in the range [1001, 1200], and contains a total of 30,651,000 voxels. In an aspect, the validation sets (320, 340) act as a separator and has information that is similar to the training and testing sets simultaneously.

Facies Classification of the F3 Block

The Netherlands F3 block is fully annotated in terms of its facies and shared publicly, along with a thorough investigation of the geology of the block. Seven out of the ten identified lithostratigraphic groups are available in this dataset, which are Upper N. S., Middle N. S., Lower N. S., Rijnland, Chalk, Scruff, and Zechstein. In an aspect, two lithostratigraphic groups (Rijnland and Chalk) are combined into one class, due to issues in the boundary between them. A breakdown of the available percentages of these classes and each class's total voxels in the training dataset, validation dataset, and testing dataset are described in Table I.

works. PyTorch is a programming toolkit that enables programming on a CPU or programming on a GPU.

During an initial phase on the training of the model 220, the patch size was fixed to 48×48. A downsampled input patch decreases in size as a scale factor increases. For example, the input downsampled patch is 24×24 for scale ×2, and is 6×6 for scale ×8. To have the input downsampled patch to the model be 24×24 in the case of scale ×8, the extracted patch is required to be of size 192×192, reducing the size of the training data.

To find an efficient compromise between the two cases, a variable patch size framework is adopted in the present disclosure. In an aspect, consider a case of extracting a square patch with side length p and a desired scale factor r, then the extracted patch size is (p×p), where $$p = \left(9 + i \cdot \left[\frac{8}{r}\right]\right) \cdot r, i \sim \mathcal{U}\{0, 15\} \quad (2)$$

where $\mathcal{U}$ {0, 15} is the discrete uniform distribution between 0 and 15. Using the Equation (2), each scale factor case has 15 different patch sizes that are uniformly picked for each iteration. In one embodiment, the input to the model is at least 9×9 in all cases.

FIG. 4A illustrates a sample 410 of seismic image extracted from the F3 block data according to aspects of the present disclosure. FIG. 4B illustrates corresponding label images (facies labels) with the grayscale scheme for each class corresponding to the extracted seismic image. In an aspect, an area 420 represents upper N.S., and an area 430 represents middle N.S. An area 440 represents lower N.S., and an area 450 represents Rijnland/Chalk. An area 460 represents Scruff and an area 470 represents Zechstein.

TABLE I

Available classes percentages breakdown

| | Zechstein | Scruff | Rijnland/Chalk | Lower N. S. | Middle N. S. | Upper N. S. |
|---|---|---|---|---|---|---|
| | | | Training set | | | |
| Total Voxels | 767,864 | 1,427,014 | 3,884,161 | 28,255,537 | 7,079,470 | 16,853,709 |
| Percentage | 1.32% | 2.45% | 6.67% | 48.49% | 12.15% | 28.92% |
| | | | Validation sets #1 and #2 | | | |
| Total Voxels | 313,336 | 923,136 | 876,617 | 6,575,585 | 1,440,196 | 3,284,130 |
| Percentage | 2.34% | 6.88% | 16.54% | 49.02% | 10.74% | 24.48% |
| | | | Test sets #1 and #2 | | | |
| Total Voxels | 1,497,374 | 6,349,422 | 4,017,836 | 33,683,862 | 6,592,420 | 14,261,086 |
| Percentage | 2.26% | 9.56% | 6.05% | 50.73% | 9.93% | 21.48% |

Training Approach for SR-CNN Model 220

In an aspect, the SR-CNN model 220 is configured to be trained on seismic images using smaller patches of the seismic sections. To increase the size of the data, patches are extracted randomly using a TorchIO UniformSampler, an open-source Python library. The TorchIO UniformSampler is configured to enable efficient loading, preprocessing, augmentation and patch-based sampling of images for deep learning. The TorchIO UniformSampler follows the style of PyTorch and integrates standard image processing libraries to efficiently process images during training of neural net- FIG. 5A-FIG. 5C illustrate various extracted patch samples 500, according to aspects of the present disclosure. FIG. 5A illustrates an extracted patch 510 that was extracted during the training of the ML model. The extracted patch 510 has a size of 72×72. FIG. 5B illustrates an extracted patch 520, having a size of 132×132. FIG. 5C illustrates an extracted patch 530 that was extracted during training of the ML model. The extracted patch 530 has a size of 192×192.

The present disclosure is configured to increase the size of the training data. Further, with simple data augmentation, the present disclosure is configured to generate more training data. Unlike natural images, the seismic data in the F3 block have the values in the range [−1, 1]. For example, these values are normalized to be in the range [0, 1] using the formula $$\hat{x} = \frac{x - x_{min}}{x_{max} - x_{min}}. \quad (3)$$

where case $x_{min}$ is −1, and $x_{max}$ is 1. The reduced formula can be written as:

$$\hat{x} = \frac{x + 1}{2}. \quad (4)$$

Figure 6:
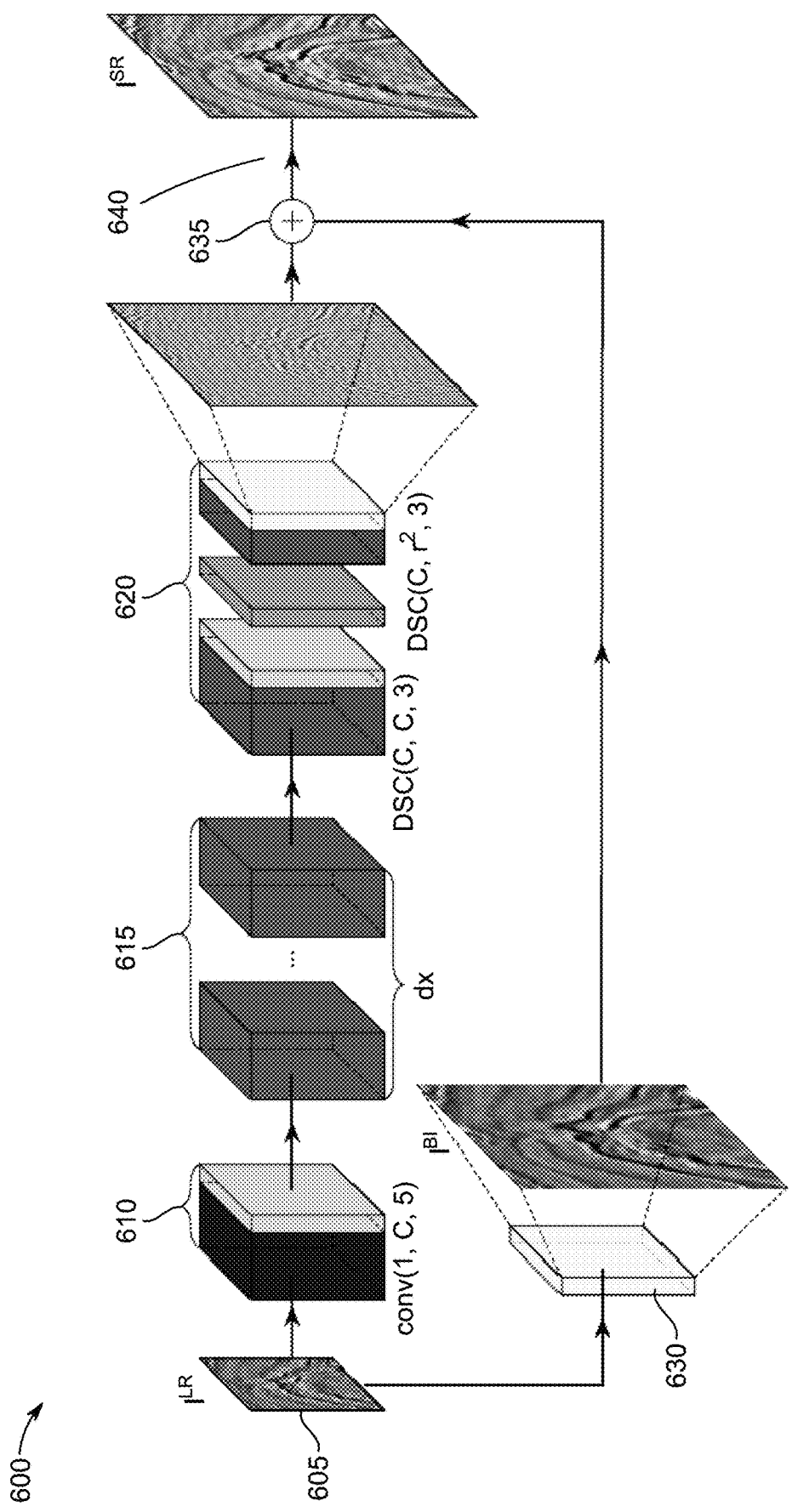
FIG. 6 is a block diagram of an efficient self-calibrated block with pixel attention (ESC-PA) super-resolution model, according to certain embodiments, according to aspects of the present disclosure.

FIG. 6 is a block diagram of an efficient self-calibrated block with pixel attention (ESC-PA) super-resolution model 600 (hereinafter referred to as the "super-resolution model 600"), according to aspects of the present disclosure. In an aspect, the ESC-PA super-resolution model 600 is similar to the SR-CNN model 220. As shown in FIG. 6, the ESC-PA super-resolution model 600 includes an input 605, a feature extraction section 610, a non-linear feature mapping section 615, a upsampling section 620, a global skip connection 630, an element wise addition section 635, and an output 640.

The input 605 is configured to receive the LR seismic image $I^{LR}$. In an aspect, the input 605 is co-operatively coupled to a computing device and receives the LR seismic image. The computing device may be any device, such as a desktop computer, a laptop, a tablet computer, a smartphone, a camera, a mobile device, or a Personal Digital Assistant (PDA). In some aspects, the input 605 is configured to receive the LR seismic image from the plurality of sensors deployed for conducting the survey.

The feature extraction section 610 is configured to extract features from the received LR seismic image. As shown in FIG. 6, the feature extraction section 610 includes a single standard convolutional layer, cony (1, C, 5), where 1 is the number of input channels, C is the number of output channels, and 5 is the kernel size. For example, the size of the kernel is (5×5). In one embodiment, the input channel is set to 1 since all SR operations is carried out on grayscale seismic images. In an operative aspect, the feature extraction section 610 is configured to apply filters or feature detectors to the received seismic image to generate the feature maps or the activation maps using a Parametric Rectified Linear Unit (PReLU) activation function. The PReLU activation function results in an output that equals the input for all positive inputs, and zero for all others. Feature detectors or filters help identify different features present in an image like edges, vertical lines, horizontal lines, bends, etc.

The non-linear feature mapping section 615 is configured to map/represent the extracted features along with the relevancy of these features, therefore excluding the irrelevant features. In an aspect, the non-linear feature mapping section 615 includes a stack of d blocks of the Efficient Self-Calibrated block with Pixel Attention (ESC-PA). In an aspect, the ESC-PA is configured to produce 3D attention maps instead of a 1D attention vector or a 2D map. As shown in FIG. 6, all activation functions of ESC-PA are the PReLU activation function. Further, the non-linear feature mapping section 615 is configured with 3×3 DSC layers to improve efficiency.

The upsampling section 620 is configured to upsample the image to a desired dimension. As shown in FIG. 6, the upsampling section 620 includes a DSC layer (C, C, 3), a pixel attention (PA block), and a DSC layer (C, $r^2$, 3). In an operative aspect, the DSC layer (C, C, 3) is followed by the PA block. Further, the PA block is followed by the DSC layer (C, $r^2$, 3). Lastly, the DSC layer (C, $r^2$, 3) is followed by a pixel shuffling operator. In one embodiment, the value of r is the desired upscale factor (2, 3, and so on). The last DSC layer and the pixel shuffling operator are configured to form a sub-pixel convolutional layer.

The global skip connection is configured to upsample the input $I^{LR}$ to a desired dimension using bicubic interpolation 630. The bicubic interpolation 630 generates an image using coarse approximation, known as $I^{BI}$. The coarse approximation $I^{BI}$ is added (via element-wise addition 635) to the output of the super-resolution model 600 to finally produce the SR output image $I^{SR}$.

The element-wise addition section 635 is configured to add to the output of the upsampling section 620 with the output of the skip connection $I^{BI}$ to produce the output image $I^{SR}$.

The output 640 is configured to display an approximate upsampled super-resolution image $I^{SR}$ that corresponds to the low resolution image $I^{LR}$.

In principle, the super-resolution model 600 is a model which is created by the ML and may be trained in a training section based on a set of labeled training data. After the training section, the super-resolution model 600 is configured to apply the learning to the received low resolution seismic images. The training section is configured to cooperate with the memory to receive information related to the stored seismic images. The training section trains one or more machine learning models using the training set obtained from the memory. As is known, before a neural network can be used for a task (e.g., classification, regression, image reconstruction, etc.), the neural network is trained to extract features through many layers (convolutional, recurrent, pooling, etc.). The neural network becomes (e.g., learns) a function that projects (e.g., maps) the image on the latent space. In other words, the latent space is the space where the features lie. The latent space contains a compressed representation of the image. This compressed representation is then used to reconstruct an input, as faithfully as possible. To perform well, a neural network has to learn to extract the most relevant features (e.g., the most relevant latent space).

In an aspect, the super-resolution model 600 is configured to employ padding in all convolutional layers to maintain the dimensions of the input image. For example, the super-resolution model 600 employs "replicate" padding, which repeats edge pixels. The number of padded pixels depends on the kernel size at the convolutional layer. If the kernel size at a certain convolutional layer is k×k, then the number of added pixels is (k−1). In an aspect, the super-resolution model 600 is referred to as the Efficient Self-Calibrated Pixel-Attention Network (ESC-PAN). The present apparatus 200 is configured to employ the super-resolution model 600 with ESC-PAN (r, C, d), where r is the desired upscale factor, C are the propagated channels through the model, and d is the number of blocks in the stack of ESC-PA blocks in the non-linear feature mapping module.

Figure 7:
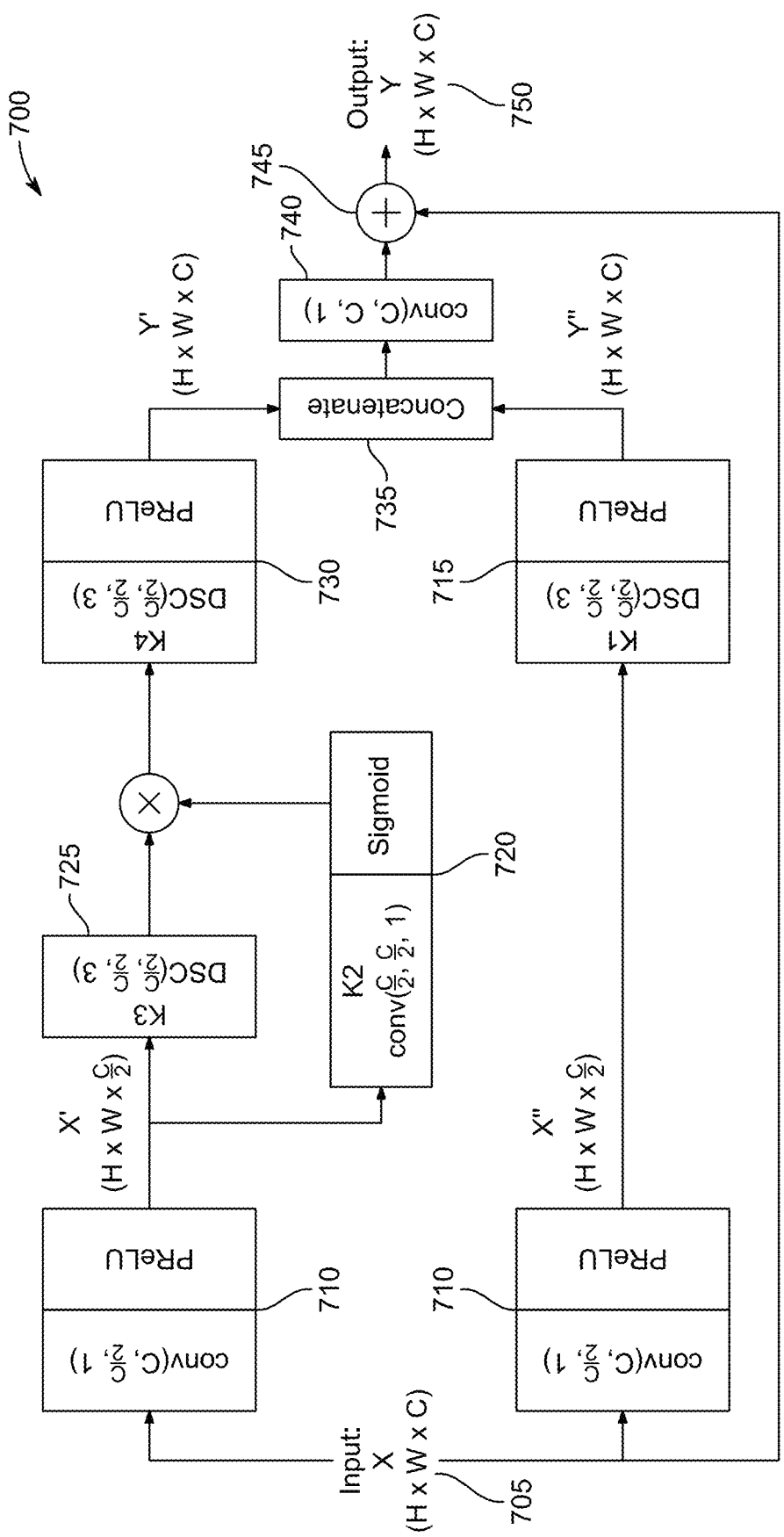
FIG. 7 is a block diagram of the ESC-PA, according to certain embodiments, according to aspects of the present disclosure.

FIG. 7 represents a block diagram of an efficient self-calibrated block with a pixel attention (ESC-PA) block 700, according to aspects of the present disclosure. As shown in FIG. 7, the pixel attention ESC-PA block 700 includes a plurality of convolutional layers (710, 720, 740), a plurality of DSC layers (715, 725, 730, 740), a concatenate block 735, a summation block 745 and an output 750. Each layer in the ESC-PA block 700 is activated with the PReLU activation function.

The plurality of convolutional layers 710 is configured to receive an input (image) X having dimensions (H×W×C). Each of the plurality of convolutional layers 710 is activated with the PReLU activation function. The PReLU activation function results an output that equals the input for all positive inputs, and zero for all others. The plurality of convolutional layers 710 is configured to generate an output X' having dimensions (H×W×C/2), and an output X" having dimensions (H×W×C/2) as shown in FIG. 7. The convolutional layer (C/2×C/2×1) 720 is further configured to receive an input X' having dimensions (H×W×C/2) from the convolutional layer 710. The convolutional layer 720 is activated by a Sigmoid activation function and generates an output. The plurality of DSC layers (715, 725) is configured to receive an input from the plurality of convolutional layers $$\left(c \times \frac{C}{2} \times 1\right) 710.$$

The DSC layer $$\left(\frac{C}{2} \times \frac{C}{2} \times 3\right) 715$$

receives an input X" having dimensions $$\left(H \times W \times \frac{C}{2}\right)$$

from the convolutional layer 710 as shown in FIG. 7. The DSC layer $$\left(\frac{C}{2} \times \frac{C}{2} \times 3\right) 715$$

is activated by the PReLU activation function and generates an Y" having dimensions $$\left(H \times W \times \frac{C}{2}\right).$$

The DSC layer $$\left(\frac{C}{2} \times \frac{C}{2} \times 3\right) 725$$

receives the input X' having dimensions $$\left(H \times W \times \frac{C}{2}\right)$$

from the convolutional layer 710. The output generated by the DSC layer $$\left(\frac{C}{2} \times \frac{C}{2} \times 3\right) 725$$

is multiplied with the output generated by the convolutional layer 720. Further, the multiplied result is inputted into DSC layer $$\left(\frac{C}{2} \times \frac{C}{2} \times 3\right) 730.$$

The DSC layer $$\left(\frac{C}{2} \times \frac{C}{2} \times 3\right) 730$$

is activated by the PReLU activation function and generates an Y' having dimensions $$\left(H \times W \times \frac{C}{2}\right).$$

The concatenate block 735 is configured to receive the input Y' from the DSC layer 730 and receive the input Y"DSC layer 715. The concatenate block 735 is configured to join the received inputs to generate a concatenated output. The convolutional layer (c×c×1) 740 is further configured to receive the concatenated output from the concatenate block 735 as an input.

The summation block 745 is configured to receive the output from the convolutional layer 740 as an input, and the input (image) X having dimensions (H×W×C). The summation block 745 is configured to sum the received inputs and generate an output Y having dimensions (H×W×C).

The output 750 is configured to receive the generated output Y from the summation block 745 and display the output that is an approximately upsampled super-resolution image that corresponds to the low resolution image.

EXAMPLES AND EXPERIMENTS

The following examples are provided to illustrate further and to facilitate the understanding of the present disclosure.
Experimental Data and Analysis
Experiment 1: Seismic Image SR In the present disclosure two versions of ESC-PAN are used for seismic image SR. The present disclosure is configured to employ seismic interpretation benefits from image analysis algorithms utilizing HVS characteristics. Further, present disclosure is configured to carry an objective as well as subjective IQA to evaluate the SR-CNN model 600, 220. The two versions are compared with state-of-the-art SR models from the literature.
Adopted Models In a training aspect, the present disclosure is configured to train all adopted models (two versions of ESC-PAN) for scales ×2, ×4, and ×8. In an aspect, a first version of ESC-PAN is a shallow model with the number of propagated channels is set to C=32, and the stack of ESC-PA blocks is set to d=1. The first version is referred to as ESC-PAN (r, 32, 1). To compare the performance of the ESC-PAN (r, 32, 1), a SR model (known as SSNet-M) is utilized as a known model having similar complexity.

A second version of ESC-PAN is a deeper and wider model with the number of propagated channels is set to C=64, and the stack of ESC-PA blocks is set to d=10. The second version is referred to as ESC-PAN (r, 64, 10). The ESC-PAN (r, 64, 10) is used because of the extreme case of upsampling with a scale ×8. When upscaling with scale ×8, each pixel in the LR input is used to produce 63 other pixels, and almost 98% of the original pixels are discarded, which results in a very difficult task that requires a more capable model. To compare the performance of the ESC-PAN (r, 64, 10), a VDSR model is utilized.

Table II summarizes the complexity of the adopted models (ESC-PAN (r, 32, 1), SSNet-M, ESC-PAN (r, 64, 10), and VDSR model). The complexity comparison considers the number of parameters of the model and the required multiply-accumulate operations (MACs) given a certain target image dimension. The Table II describes the complexity of these models for ×8 SR with a target image of size 540×360 to calculate the MACs. In an aspect, k stands for 103 parameters, M stands for 106 MACs, and G stands for 109 MACs. It can be noted from the table II that the light complexity of ESC-PAN (r, 32, 1) is similar to SSNet-M, and the high complexity of the deeper ESC-PAN (r, 64, 10) is still lighter than the VDSR model, but both are considered as high-complexity models.

TABLE II

Complexity for the adopted models for a target image of size 540 × 360 for scale × 8

| Model | Parameters | MACs |
| --- | --- | --- |
| ESC-PAN (8, 32, 1) | 9.2k | 27.8M |
| SSNet-M | 14.1k | 44.5M |
| ESC-PAN (8, 64, 10) | 147.3k | 444.0M |
| VDSR | 664.7k | 128.9G |

Experiment 2: Training of the Super-Resolution Model 600

Depending on the desired scale factor r, the extracted training sample is downsampled using bicubic resampling to generate the $I^{LR}$ input image. Then the $I^{LR}$ input image is upsampled using the one of the adopted models. In an aspect, a horizontal flipping is adopted for augmenting training data. During validation of the SR model, the model is evaluated on entire seismic sections without any augmentation. The model with the highest validation Peak Signal-to-Noise Ratio (PSNR) is saved and used for testing. Peak Signal to Noise Ratio (PSNR) is generally defined as the ratio between the maximum possible power of an image and the power of corrupting noise that affects the quality of its representation. In one embodiment, an adam optimizer is used with $\alpha_1=0.9$, $\beta_2=0.999$, $\epsilon=10^{-8}$ and an initial learning rate of 1/750. In an aspect, the adam optimizer performs adaptive moment estimation. The adam optimizer is an algorithm for optimization technique for gradient descent. The learning rate reduces by a factor of 0.75 if the validation PSNR plateaus is used for 30 epochs, and would stop decaying when the validation PSNR reaches $10^{-4}$. Since the dataloading is done in a random sampling fashion, infinite samples can be extracted if the sampler is not interrupted. Therefore 500 batches of training samples are used before the validation process starts. Each batch is of size 64, thus a total of 32,000 seismic image patches of random sizes are used in one training "epoch". All models are trained for 500 epochs. $\mathcal{L}^{\ell_1}$ loss is adopted for training both ESC-PAN models, and $\mathcal{L}^{\ell_2}$ is adopted for VDSR and SSNet-M since both models were proposed with the training loss.

Results and Discussion

Image Quality Assessment (IQA):

IQA metrics measure the degradation of an image, such as blurring, artifacts and noise. The IQA metrics are either subjective metrics, where a human views the image of interest and provides a score, or objective metrics, where the quality of image of interest is measured using quantitative methods. Objective metrics are either full-reference, where in the present disclosure $I^{HR}$ is available, or reduced-reference, where only certain elements and features from $I^{HR}$ are available, and finally no-reference, where $I^{HR}$ is not required.

In an aspect, the present disclosure is configured to employ two types of IQA metrics, as discussed below along with their mathematical formulation.

Peak Signal-to-Noise Ratio (PSNR)

PSNR is one of the most popular and most used metrics for evaluating the objective reconstructed quality of an image. In the case of SR, the reconstruction quality of $I^{SR}$ from $I^{LR}$ is compared to the ground truth $I^{HR}$. If $I^{SR}$ and $I^{HR}$ have the dimensions m×n, then the PSNR, measured in dB, can be defined as function of pixel intensities' dynamic range, dubbed L (255 for 8-bit grayscale images), and Mean Square Error (MSE) as follows $$PSNR = 10 \cdot \log_{10}\left(\frac{L^2}{MSE}\right) = \tag{5}$$

$$10 \cdot \log_{10}\left(\frac{L^2}{\frac{1}{mn}\sum_{i=0}^{m-1}\sum_{j=0}^{n-1}[I^{SR}(i,j) - I^{HR}(i,j)]^2}\right).$$

If $I^{HR}$ and $I^{SR}$ are identical, then MSE=0 and PSNR approaches ∞.

Structural Similarity Index (SSIM Index)

Unlike PSNR, which measures the quality pixel-wise, SSIM index considers local image structures using spatial domain local statistics, such as mean, variance, and covariance between the reconstructed $I^{SR}$ and its corresponding ground truth $I^{HR}$. SSIM formulation consists of three individual comparison functions. Each comparison function tries to estimate one of the following, luminance (l) that depends on the mean, contrast (c) that depends on the variance, and structure (s) that depends on the covariance. SSIM can also be calculated in local blocks of the image, or globally. To calculate SSIM index between $I^{SR}$ and $I^{HR}$, both images are subdivided into M blocks, and the total SSIM is calculated as follows $$SSIM\left(I^{SR}, I^{HR}\right) = \frac{1}{M}\sum_{j=1}^{M} SSIM\left(I_j^{SR}, I_j^{HR}\right). \tag{6}$$

For easier notation, assume block $I_j^{SR}$ is denoted by x, and block $I_j^{HR}$ is denoted by y. If block x has a mean value $\mu_x$ and variance $\sigma_x$, and block y has a mean value $\mu_y$ and variance $\sigma_y$, and if the covariance between x and y is $\sigma_{xy}$, then the three comparison functions are defined as $$l(x, y) = \frac{2\mu_x\mu_y + c_1}{\mu_x^2 + \mu_y^2 + c_1}, \tag{7}$$

$$c(x, y) = \frac{2\sigma_x\sigma_y + c_2}{\sigma_x^2 + \sigma_y^2 + c_2},$$

$$s(x, y) = \frac{\sigma_{xy} + c_3}{\sigma_x\sigma_y + c_3},$$

where $c_1=(k_1L)^2$, $c_2=(k^2L)^2$, and $c_3$ are constants to avoid the division with a small number, and $k_1$, $k_2 \ll 1$ are small constants. SSIM is found as weighted product of the three comparison functions as such $$SSIM(x,y)=[l(x,y)^\alpha \cdot c(x,y)^\beta \cdot s(x,y)^\gamma]. \quad (8)$$

If $c_3=c_2/2$ and the weights $\alpha=\beta=\gamma=1$ resulting in the following reduced formulation of SSIM $$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}. \quad (9)$$

If $I^{HR}$ and $I^{SR}$ are identical, then $\mu_x=\mu_y$, $\sigma_x=\sigma_y$, and $\sigma_{xy}=\sigma_x^2=\sigma_y^2$ for all $I_j^{SR}$ and $I_j^{HR}$, and SSIM value reduces to $$SSIM(I^{HR}, I^{SR}) = \frac{1}{M}\sum_{j=1}^{M} \frac{(2\mu_x^2 + c_1)(2\sigma_x^2 + c_2)}{(2\mu_x^2 + c_1)(2\sigma_x^2 + c_2)} = \frac{1}{M}\sum_{j=1}^{M} 1 = 1. \quad (10)$$

Experiment 3: Evaluate the Performance Using Semantic Segmentation Metrics

To objectively evaluate the performance of the present disclosure on used dataset, a set of evaluation metrics is used that are commonly used in the computer vision literature. In the present disclosure, several objective evaluation metrics for semantic segmentation are employed. Assume that the set of manually labeled pixels as class i is denoted by $L_i$, and the set of pixels classified by the evaluated classifier model as class i is denoted by $C_i$. Then the set of correctly classified pixels of class i are in the set $C_i \cap L_i$. In an aspect, |•| denotes the number of elements in a given set, and the following semantic segmentation objective evaluation metrics are defined.

Pixel Accuracy

Pixel Accuracy (PAc) can be defined as the number of correctly classified pixels over the number of all pixels. This can be formulated as such $$PAc = \frac{\sum_i |C_i \cap L_i|}{\sum_i |L_i|}. \quad (11)$$

Class Accuracy

Class Accuracy (CA) for a certain class i can be defined as the number of correctly classified pixels over the number of manually labelled pixels for that class. This can be formulated as such $$CA_i = \frac{|C_i \cap L_i|}{|L_i|}. \quad (12)$$

If N classes are used, then the Mean Class Accuracy (MCA) is defined as the average value of all $CA_i$ for all classes. MCA is mathematically defined as $$MCA = \frac{1}{N}\sum_i CA_i = \frac{1}{N}\sum_i \frac{|C_i \cap L_i|}{|L_i|}. \quad (13)$$

Intersection Over Union

For a given class i, Intersection over Union (IU) can be defined as the intersection of $C_i$ and $L_i$ over their union as follows $$IU_i = \frac{|C_i \cap L_i|}{|C_i \cup L_i|}. \quad (14)$$

If all the pixels in class i are classified correctly, then $|C_i \cap L_i|=|C_i \cup L_i|$ and $IU_i=1$. Similar to MCA, an average over all the $IU_i$ is performed to obtain the Mean IU as follows $$\text{Mean } IU = \frac{1}{N}\sum_i IU_i = \frac{1}{N}\sum_i \frac{|C_i \cap L_i|}{|C_i \cup L_i|}. \quad (15)$$

To prevent the sensitivity to small-sized classes by weighing each class by its size. The result is referred to as Frequency-Weighted Intersection over Union (FWIU) defined mathematically as follows $$FWIU = \frac{1}{\sum_k |L_k|} \cdot \sum_i |L_i| \cdot \frac{|C_i \cap L_i|}{|C_i \cup L_i|}. \quad (16)$$

Loss Functions

The present disclosure is configured to use following loss functions as described here:

Super-Resolution Loss Function

For SR, $I^{SR}$ prediction produced by the super-resolution model 600 is evaluated on how close it is from the ground truth $I^{HR}$. There are several loss functions that are used in the literature for SR, and in this work, $\ell_1$ pixel-level loss is adopted for SR, which can be described as follows $$L^{\ell_1} = \frac{1}{mn}\sum_{i=0}^{m-1}\sum_{j=0}^{n-1} |I^{SR}(i,j) - I^{HR}(i,j)|, \quad (17)$$

where |•| here denotes the absolute value. MSE, or $\mathcal{L}^{\ell_2}$, is another popular pixel-level loss function used to train SR models, such VDSR and SSNet-M, which can be described as follows $$L^{\ell_2} = \frac{1}{mn}\sum_{i=0}^{m-1}\sum_{j=0}^{n-1} [I^{SR}(i,j) - I^{HR}(i,j)]^2. \quad (18)$$

Facies Classification Loss Function

For facies classification, a Cross-Entropy (CE) loss function is adopted. CE loss is a widely used function for a classification task. Given the ground truth true label $p_i$, and the predicted model label $q_i$, then the CE measures the dissimilarity between both $p_i$ and $q_i$ using the formula $$\mathcal{L}^{CE}(p, q) = -\sum_i p_i \cdot \log q_i. \quad (19)$$

Figure 8:
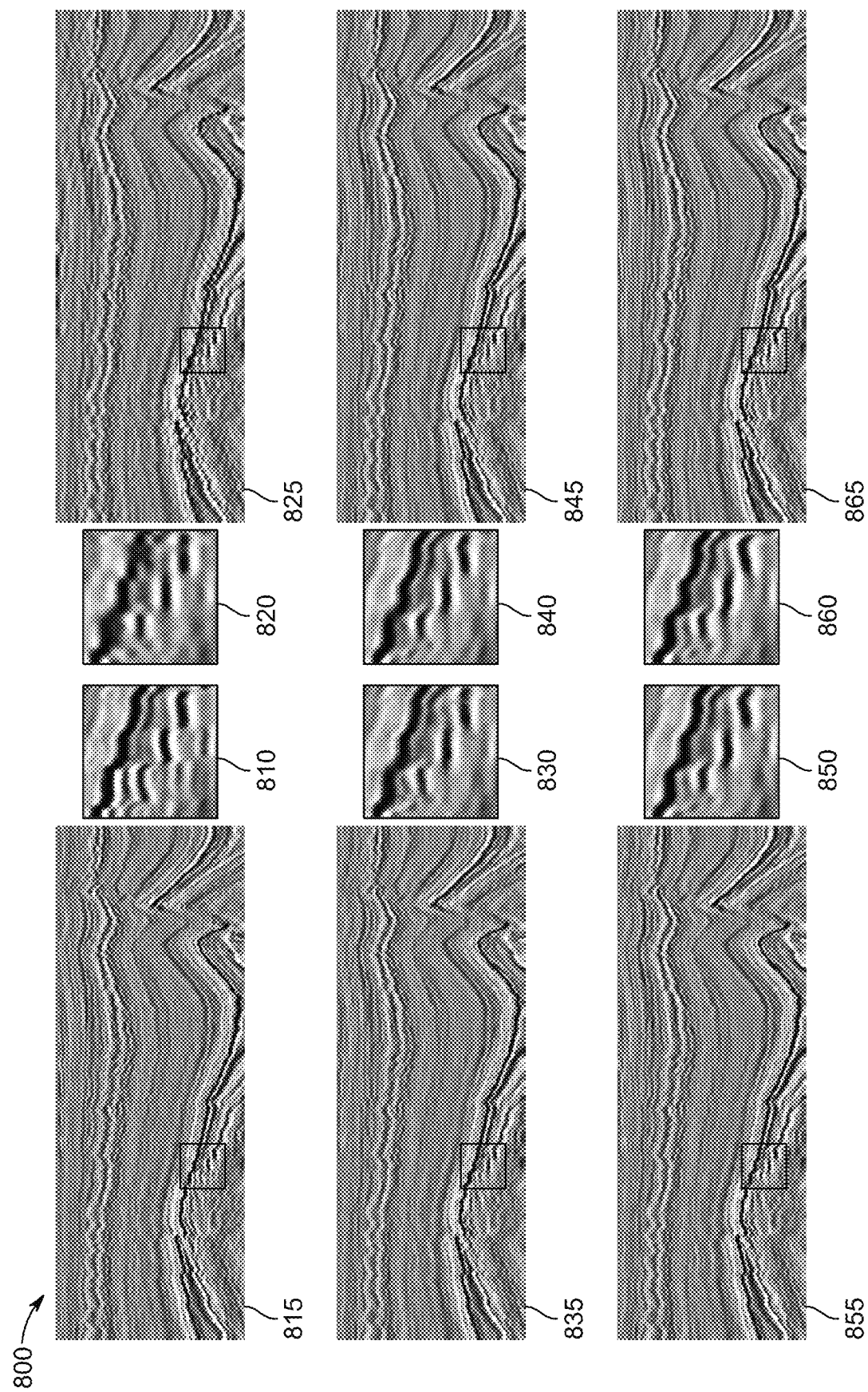
FIG. 8 illustrates examples of seismic image super-resolution for scale ×4, according to aspects of the present disclosure.

FIG. 8 illustrates examples 800 of seismic image super-resolution for scale ×4. Block 815 illustrates a ground truth (reference binary image) and block 810 illustrates an enlarged view of a selected portion of the block 815. For the scale ×4 case as illustrated in FIG. 8, block 825 illustrates a seismic image processed by the bicubic interpolation having PSNR=23.57 dB and SSIM=0.691 and block 820 illustrates an enlarged view of a selected portion of the block 825. Block 825 is fair in terms of maintaining the general structure, however the results are noticeably blurry with minimal sharpness between layers' boundaries, as seen in the zoomed-in patch (shown by 820). Block 835 illustrates a seismic image processed by a SSNet-M model having PSNR=25.88 dB and SSIM=0.783 and block 830 illustrates an enlarged view of a selected portion of the block 835. Block 845 illustrates a seismic image processed by an ESC-PAN (4, 32, 1) model having PSNR=26.60 dB and SSIM=0.817 and block 840 illustrates an enlarged view of a selected portion of the block 845. Block 855 illustrates a seismic image processed by a VDSR model having PSNR=27.04 dB and SSIM=0.826 and block 850 illustrates an enlarged view of a selected portion of the block 855. Block 865 illustrates a seismic image processed by an ESC-PAN(4, 64, 10) model having PSNR=27.59 dB and SSIM=0.849 and block 860 illustrates an enlarged view of a selected portion of the block 865.

As shown in FIG. 8, all available SR models produce better reconstruction in terms of maintaining better structural information and sharpness when compared with bicubic interpolation. The details in the zoomed-in patch are similar to the ground truth. Comparing SSNet-M with ESC-PAN (4, 32, 1), SSNet-M reconstruction is slightly blurrier and noisier, which is more noticeable in the zoomed-in patch (block 830). Comparing VDSR with ESC-PAN (4, 64, 10) reconstruction, the details in the zoomed-in patch for both models are highly similar. The staircase-like boundary is maintained with fine separation and continuation in the layers, whereas in both SSNet-M and ESC-PAN (4, 32, 1), the reconstruction loses a bit information when the sharp transition occurs in-between "steps" of the staircase. ESC-PAN (4, 64, 10) achieves the highest PSNR and SSIM for the illustrated seismic section.

Figure 9:
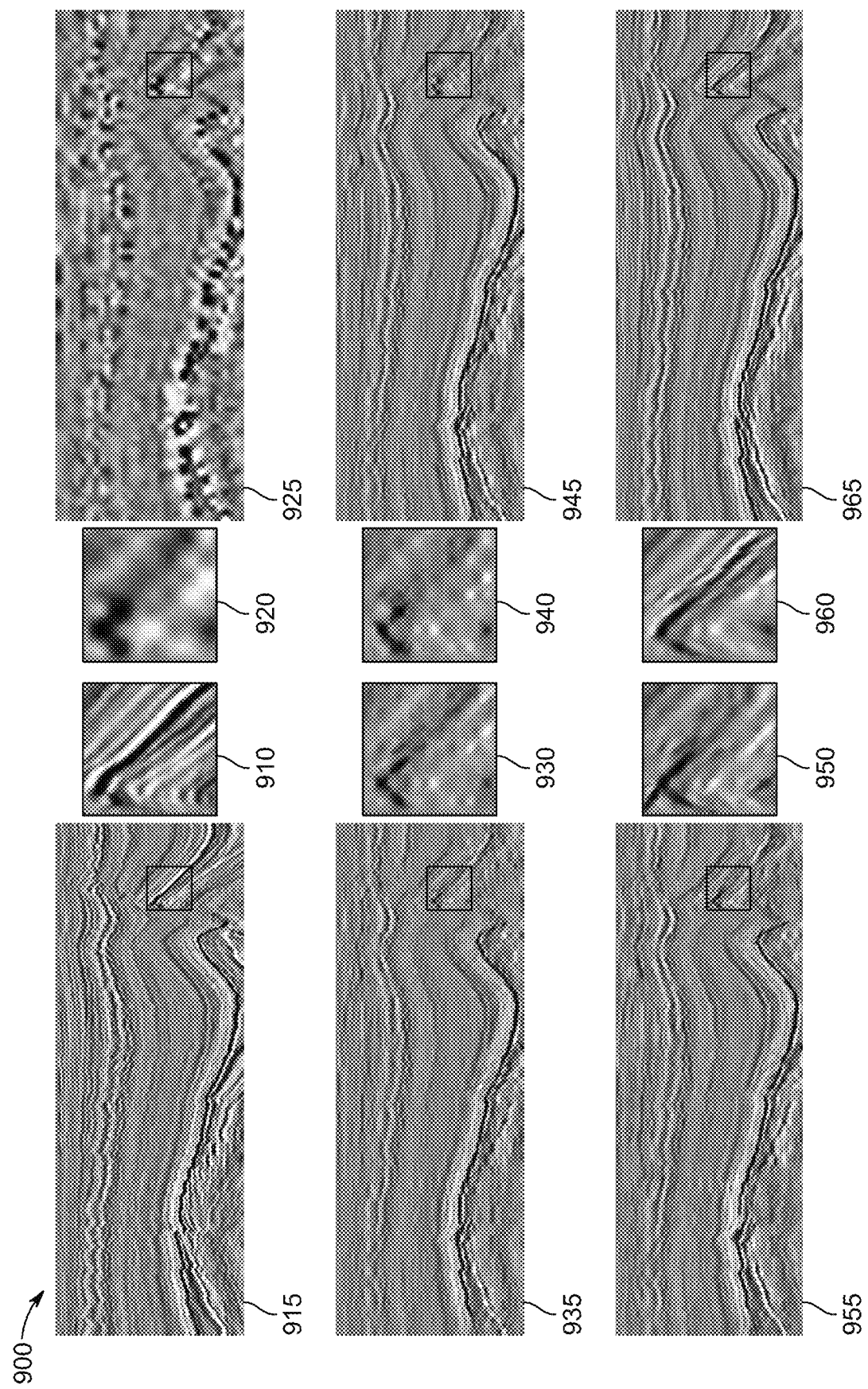
FIG. 9 illustrates examples of seismic image super-resolution for scale ×8, according to aspects of the present disclosure.

FIG. 9 illustrates examples 900 of seismic image super-resolution for scale ×8. Block 915 illustrates a ground truth (reference binary image) and block 910 illustrates an enlarged view of a selected portion of the block 915. For the scale ×8 case illustrated in FIG. 9, block 925 illustrates a seismic image processed by the bicubic interpolation having PSNR=18.17 dB and SSIM=0.359 and block 920 illustrates an enlarged view of a selected portion of the block 925. Block 935 illustrates a seismic image processed by a SSNet-M model having PSNR=21.32 dB and SSIM=0.550 and block 930 illustrates an enlarged view of a selected portion of the block 935. Block 945 illustrates a seismic image processed by an ESC-PAN (8, 32, 1) model having PSNR=21.48 dB and SSIM=0.575 and block 940 illustrates an enlarged view of a selected portion of the block 945. Block 955 illustrates a seismic image processed by a VDSR model having PSNR=21.46 dB and SSIM=0.580 and block 950 illustrates an enlarged view of a selected portion of the block 955. Block 965 illustrates a seismic image processed by an ESC-PAN (8, 64, 10) model having PSNR=22.71 dB and SSIM=0.664 and block 960 illustrates an enlarged view of a selected portion of the block 965.

For the scale ×8 case illustrated in FIG. 9, the difficulty of extraction of a clear seismic image is increased significantly. Bicubic reconstruction as shown by block 925 is quite unreadable with only the boundary in the lower middle part of the seismic section that is a bit distinguishable. The details in the upper part of the seismic section are almost completely eliminated. Furthermore, the reconstruction of ESC-PAN (8, 32, 1), in block 945, and SSNet-M, in block 935, for this case highlights the limitations of these small model's capability for the difficult task of ×8 SR. Blocking artifacts are apparent over the seismic section, and these artifacts are clearly apparent in the zoomed-in patch. VDSR reconstruction in block 955 does not suffer from blocking artifacts as clearly as the smaller models However, VDSR results are smoothed and includes apparent illusions with edges that do not exist in the ground truth seismic section. ESC-PAN (8, 64, 10) reconstructs the seismic section with clearly better accuracy shown in block 965. In the zoomed in patch, ESC-PAN (8, 64, 10) is the only method that is still able to reconstruct part of the boundary that exists in the ground truth section. The upper part of the section has finer details when compared with all the other methods. The reconstruction of ESC-PAN (8, 64, 10) is not identical to the ground truth section However it is important to call attention to the difficulty of the task at hand, and with almost only 2% of the original pixels, the output resembles the general structure of ground truth section with decent accuracy, as can be seen in the noticeably higher value of SSIM.

TABLE III

Seismic Image SR objective evaluation results for scales ×2, ×4, and ×8

| Method | Scale | Valid Set #1 | | Valid Set #2 | | Test Set #1 | | Test Set #2 | |
| --- | --- | --- | --- | --- | --- | --- | --- | --- | --- |
| | | PNSR | SSIM | PNSR | SSIM | PNSR | SSIM | PNSR | SSIM |
| Bicubic Interpolation | ×2 | 37.04 | 0.9849 | 39.11 | 0.9856 | 37.91 | 0.9865 | 37.78 | 0.9826 |
| SSNet-M | | 40.46 | 0.9924 | 41.60 | 0.9916 | 40.39 | 0.9922 | 40.19 | 0.9890 |
| ESC-PAN (2, 32, 1) | | 41.06 | 0.9931 | 42.03 | 0.9921 | 40.75 | 0.9926 | 40.52 | 0.9896 |
| VDSR | | 42.06 | 0.9936 | 42.55 | 0.9924 | 41.78 | 0.9930 | 41.03 | 0.9899 |
| ESC-PAN (2, 64, 10) | | 42.32 | 0.9938 | 42.65 | 0.9925 | 42.18 | 0.9932 | 41.15 | 0.9901 |
| Bicubic Interpolation | ×4 | 23.27 | 0.6840 | 25.01 | 0.6903 | 23.44 | 0.6829 | 24.77 | 0.7102 |
| SSNet-M | | 25.57 | 0.7750 | 26.72 | 0.7703 | 25.49 | 0.7659 | 26.10 | 0.7647 |
| ESC-PAN (4, 32, 1) | | 26.14 | 0.8084 | 27.16 | 0.7943 | 26.05 | 0.7934 | 26.38 | 0.7792 |
| VDSR | | 26.97 | 0.8298 | 27.81 | 0.8141 | 26.38 | 0.8042 | 26.78 | 0.7937 |
| ESC-PAN (4, 64, 10) | | 27.59 | 0.8535 | 28.31 | 0.8335 | 26.78 | 0.8209 | 26.95 | 0.8001 |
| Bicubic Interpolation | ×8 | 17.98 | 0.3565 | 20.05 | 0.4036 | 18.22 | 0.3508 | 19.58 | 0.4023 |
| SSNet-M | | 21.22 | 0.5513 | 22.85 | 0.5770 | 21.31 | 0.5389 | 22.16 | 0.553 |
| ESC-PAN (8, 32, 1) | | 21.36 | 0.5798 | 23.14 | 0.6046 | 21.47 | 0.5650 | 22.36 | 0.5769 |
| VDSR | | 21.54 | 0.5881 | 23.05 | 0.5956 | 21.34 | 0.5549 | 22.07 | 0.5612 |
| ESC-PAN (8, 64, 10) | | 22.86 | 0.6808 | 23.91 | 0.6660 | 22.11 | 0.6200 | 22.77 | 0.6139 |

Table III summarizes the testing results on the validation sets #1 and #2 and the test sets #1 and #2 using the objective image quality assessment (IQA) metrics (PSNR and SSIM). The testing in Table III is done on the entire seismic sections. Similar to the training procedure, the input image is first downsampled with the desired scaling factor of interest, then upsampled again by each one of the methods. Compared with the small models, the results clearly show superior performance of ESC-PAN (r, 32, 1) over SSNet-M, and over the conventional bicubic interpolation with a larger margin. The deeper ESC-PAN (r, 64, 10) outperforms VDSR and all the other models for all scales. For scale ×2, all methods achieve high objective IQA scores, and this is due to the easy difficulty of this task. Seismic data is highly correlated, and in the case of scale ×2, only 3 pixels are interpolated for the input image. For scale ×4, the margin of improvement of ESC-PAN (4, 64, 10) is significant, which is on average 3.3 dB when compared with bicubic interpolation, and is 0.32 dB on average when compared with the second best performing model, VDSR. For scale ×8, the margin of improvement in ESC-PAN (8, 64, 10) when compared to bicubic interpolation is almost 4 dB on average for all sets, and when compared with ESC-PAN (8, 32, 1), which is the second best performing model in this case, is more than 1 dB on average for all sets. These are substantial differences and can be explained by the capability of the model. ESC-PAN (8, 64, 10) has more than ×10 the parameters when compared with ESC-PAN (8, 32, 1). The ESC-PAN (8, 32, 1) is significantly less complex than VDSR, as shown in Table II, and the VDSR performs slightly worse than ESC-PAN (8, 32, 1) for the case of ×8 SR in Validation Set #2 and both test sets.

In the present disclosure, the super-resolution facies loss (SRFL) is configured to direct the SR model to be facies-aware when upsampling. Since the output of the SR model 600 considers the facies classification, then incorporating the facies information improves the seismic section reconstruction.

Figure 10:
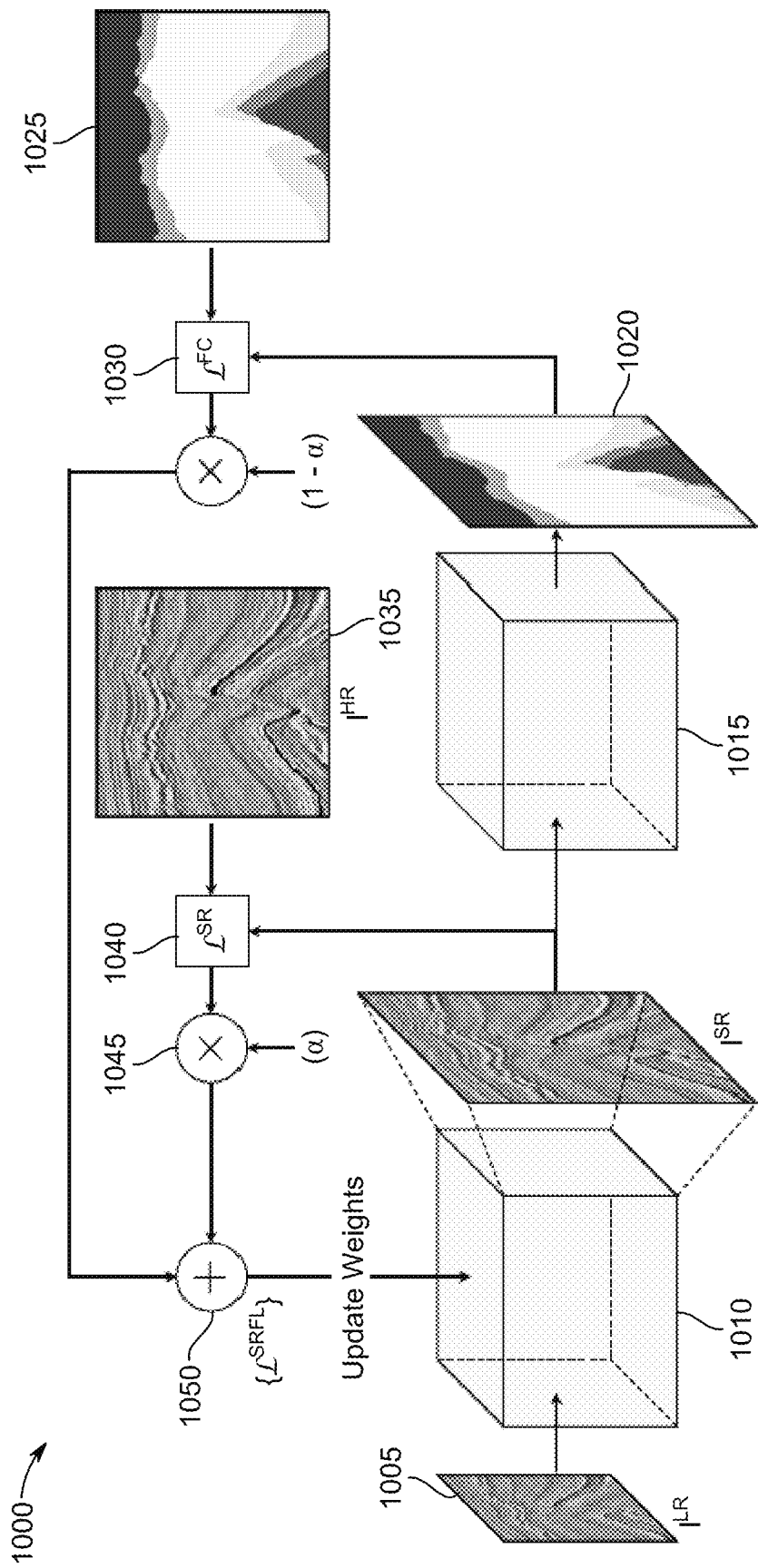
FIG. 10 is a block diagram of a facies loss training workflow, according to aspects of the present disclosure.

FIG. 10 is a block diagram of a facies loss training workflow 1000, according to aspects of the present disclosure. As shown in FIG. 10, the facies loss training workflow 1000 includes an input 1005, a SR model 1010, a facies classification model 1015, a set of predicted labels 1020, a set of class labels 1025, a facies classification loss function 1030, an output 1035, a SR loss function 1040, a multiplier 1045, and an adder 1050.

The input 1005 is configured to receive a low-resolution (LR) seismic image extracted from a seismic volume. In an aspect, the input 1005 receives the LR seismic image from a computing device. The SR model 1010 is configured to receive the LR seismic image from the input 1005. The construction and working of the SR model 1010 is similar to that of the super-resolution model 600 as discussed in FIG. 6 and thus the construction is not explained in detail for the sake of brevity. The SR model 1010 is configured to produce the SR output image $I^{SR}$. The facies classification model 1015 is configured to receive the SR output image $I^{SR}$ from the SR model 1010. In an aspect, the section-based facies classification model is adopted as the facies classification model as shown in FIG. 10. In an aspect, the facies classification model includes skip connections and an augmented training data. The facies classification model is only used for inference, and its parameters are frozen throughout the workflow 1000. The facies classification model 1015 is configured to generate the set of predicted labels 1020 as shown in FIG. 10. The set of class labels 1025 represents several reference images.

In an operative aspect, the facies loss training workflow 1000 is configured to work in two parts. A first part of the workflow 1000 is a standard supervised training procedure for SR, where $I^{HR}$ (shown by 1035) is the ground truth HR image that is degraded into the LR input image $I^{LR}$. The output of the SR model, $I^{SR}$, is evaluated using the SR loss function $\mathcal{L}^{SR}$ shown by 1040. The SR loss function $\mathcal{L}^{SR}$ is multiplied with $\alpha$ shown by 1045. A second part of the workflow 1000 is feeding $I^{SR}$ to a trained facies classifier and evaluating its output using the facies classification loss function $\mathcal{L}^{FC}$ shown by 1030. The facies classification loss function is multiplied with $(1-\alpha)$. As shown by 1050, the total loss $\mathcal{L}^{SRFL}$ is calculated as a linear combination of both losses as such $$\mathcal{L}^{SRFL} = \alpha \cdot \mathcal{L}^{SR} + (1-\alpha) \cdot \mathcal{L}^{FC} \quad (20)$$

where $\mathcal{L}^{SRFL}$ =is a general loss function, where if only SR is desired, set $\alpha$=1. In the facies loss training workflow 1000, $\mathcal{L}^{SR}$ is selected to be $\mathcal{L}^{\ell 1}$, as defined in Equation (17), and $\mathcal{L}^{FC}$ is selected to be the cross-entropy (CE) loss $\mathcal{L}^{CE}$ as defined in Equation (19). In an aspect, the total loss $\mathcal{L}^{SRFL}$ is configured to update weights of the SR model 1010.

In the computer vision literature, two baseline models are employed that are based on deconvolution networks for facies classification. These two baseline models are trained with the same hyperparameters. However, one model (section-based models) trains on entire seismic sections, and one model (patch-based models) trains on smaller patches of the seismic section. Results showed significant improvement in Mean Class Accuracy, defined in Equation (13), when using section-based models rather than patch-based models. In the present disclosure, the section-based facies classification model is adopted as the facies classification model as shown in FIG. 10. In an aspect, the facies classification model includes skip connections and an augmented training data. The facies classification model is only used for inference, and its parameters are frozen throughout the workflow 1000.

The apparatus 200 is configured to employ two versions of ESC-PAN. First version is used for visualizations for training with $\mathcal{L}^{SRFL}$, and has a sensitivity of the visual output to $\alpha$, as discussed in Equation (20). The facies classification results of the first version are described using semantic segmentation metrics. The results are generated for scales ×2, ×4, and ×8.

Figure 11:
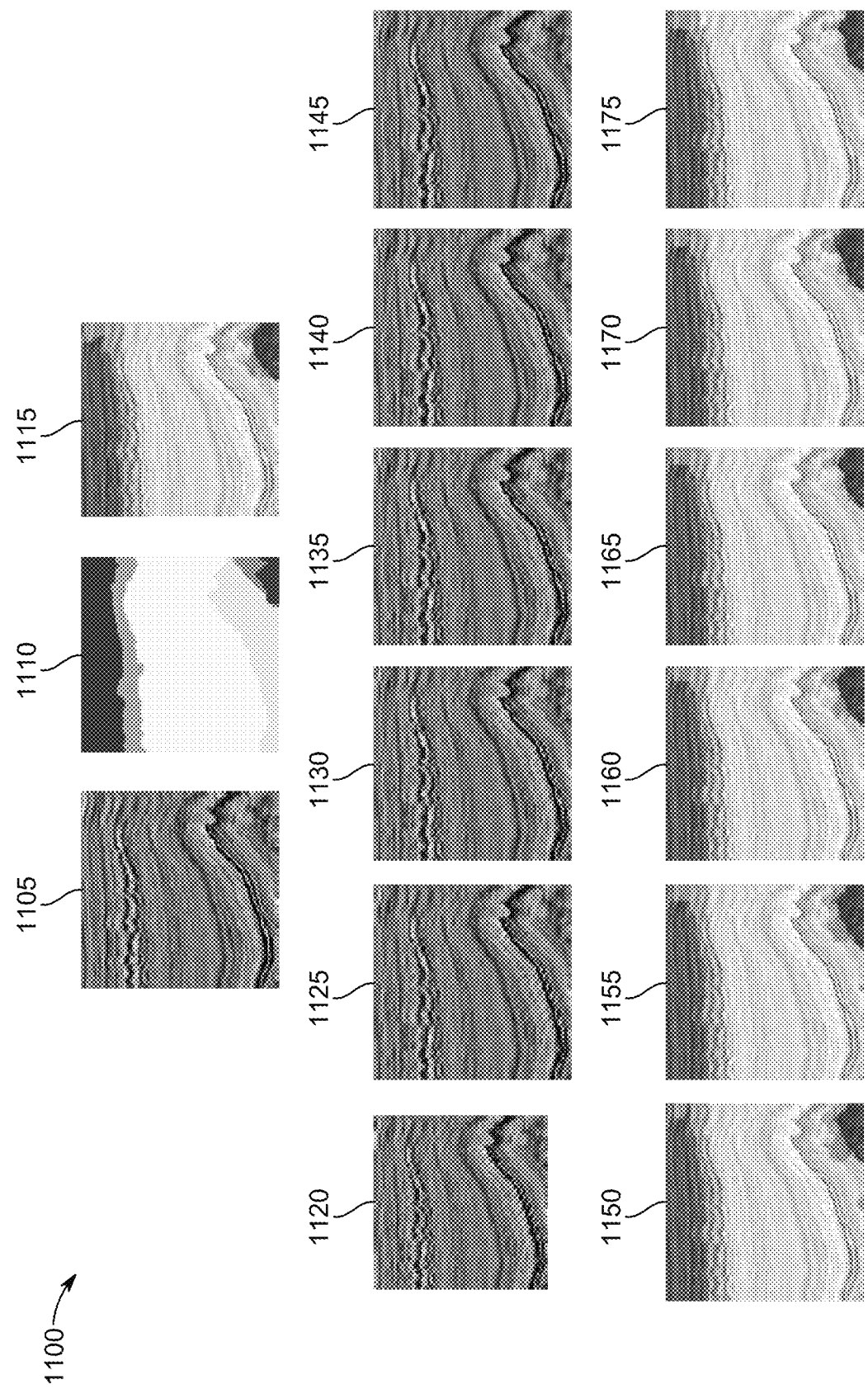
FIG. 11 illustrates facies classification samples for training with different values of $\alpha$, according to aspects of the present disclosure.

FIG. 11 illustrates facies classification samples 1100 for training with different values of $\alpha$. In an aspect, FIG. 11 represents a visualization of various samples for training with the SRFL model (SR model 1010 considering the super-resolution facies loss). To illustrate the effects of $\alpha$ in Equation (20), ESC-PAN (4, 32, 1) was trained on six different values of $\alpha$ for ×4 SR. Each case trains ESC-PAN (4, 32, 1) for only 50 epochs. The six cases of $\alpha$ values are [0, 0.25, 0.5, 0.75, 0.9, 1]. FIG. 11 illustrates the results obtained from this experiment. Block 1105 illustrates the ground truth seismic section, block 1110 illustrates the ground truth facies labels, and block 1115 illustrates the classification of the facies classifier when the input is the ground truth seismic section. The predicted classification label map is overlayed on the original ground truth seismic section in block 1105 to see the original boundaries. There is a little bit of misclassification in block 1115 in the top between Upper and Middle N. S. classes. There is also an error in the lower right corner in classifying Scruff above Zechstein.

For the visual SR performance, refer to blocks 1120-1145. The gradual improvement can be observed in both subjective and objective image quality from the case of α=0 in block 1120 to α=1 in block 1145. The improvement in PSNR is almost 1 dB from α=0 to α=0.25, and the same thing from α=0.25 to α=0.5. However, as α starts increasing from 0.75 to 1, the improvement is 1.5 dB for this seismic section. The middle case of α=0.9 provides a compromise of using a little bit of the facies loss, while maintaining decent visual output. Although the improvement in PSNR is almost 1 dB from α=0.9 in block 1140 to α=1 in block 1145, the subjective quality is hardly distinguishable.

For facies classification performance visualization, refer to blocks 1150-1175. Similar to block 1115, the predicted label maps are overlayed on the original seismic section. It is interesting to note that the facies classification performance does not differ that much from the case of α=0 in block 1150 to α=1 in block 1175. For the case of α=0, where the loss function is purely for the facies classification, the top area is improved marginally, but there are more errors in classifying Scruff in the lower part of the seismic section. The cases of α=0.25 in block 1155 and α=0.5 in block 1160 actually provide the closest classification to the original classification in block 1115. However, both cases have noisy seismic output sections in block 1125 and block 1130. Training on SR for the case of α=1 in block 1175 has the worst facies classification performance, where Scruff is almost non-existent. Both cases of α=0.75 and α=0.9 have similar facies classification performance, however the visual output of α=0.9 is still better in both subjective and objective image quality.

In summary, the case of α=0.9 provides a good result between maintaining good SR visual output in both subjective and objective image quality, while producing decent facies classification performance that allows the original facies classifier to classify the output similar to that of a ground truth seismic section.

Experiment 4: Training of the SRFL Model

Both ESC-PAN (r, 32, 1) and ESC-PAN (r, 64, 10) are trained with $\mathcal{L}^{SRFL}$ with α=0.9 to maintain decent visual output with fewer artifacts, while maintaining acceptable facies classification performance based on the aforementioned study discussion. The selected facies classifier is trained on classifying entire seismic sections, and the training is also based on section-based. Inline and crossline sections are obtained from the training sets and the validation sets. In an aspect, a random horizontal flipping is used to augment the training data. In one embodiment, the validation loss is $\mathcal{L}^{SRFL}$, and the model with the lowest validation loss is saved and used for testing for all cases.

In an aspect, an adam optimizer is used with $\alpha1=0.9$, $\beta2=0.999$, $\epsilon=10^{-8}$ and an initial learning rate of $10^{-3}$. The learning rate reduces by a factor of 0.75 if the validation loss plateaus for 30 epochs are used, and the learning would stop decaying when the learning rate reaches $10^{-4}$.

Experiment 5: Facies Classification Results and Discussion

In the computer vision literature, using available machine learning benchmark as a starting point, the results are reproduced with the rescaled data using the section-based model with skip connections and training data augmentation. When the image dimensions are not divisible with the scale factor of interest (i.e., 255×401 not divisible by 2 in both dimensions), to avoid loss in dimensions of the input images when testing, the present disclosure is configured to concatenate a copied version of the last column(s) and row(s) to the input until its dimensions are divisible by the required scaling factor. This expanded image is first downsampled and then upsampled using the SR methods. After upsampling, the added column(s) and row(s) are removed to get the original dimensions back that matches the label map. This version of the SR image acts as the input of the same facies classification model trained on the original ground truth seismic sections. The testing results are summarized in Table IV. All these metrics have normalized values in the range [0,1].

The first row in Table IV is the reproduced original facies classifier results when tested on ground truth data with no degradation. In the case of degradation with scale ×2, the results are almost identical in all metrics to the ground truth. This is because ×2 SR is not a difficult task, especially for seismic images since the images are highly correlated. All methods reconstruct the input image to the original dimensions with minimal loss in the data in this case. This can also be noticed in Table III, where PSNR and SSIM values are high. For scale ×4, the differences in scores start increasing.

It is interesting to note that ESC-PAN (4, 32, 1)-$\mathcal{L}^{SRFL}$ performs almost as well as the deeper more complex model ESC-PAN (4, 64, 10), trained only on $\mathcal{L}^{\ell_1}$, with a slightly better overall MCA. Although scale ×4 is not an easy task, $\mathcal{L}^{SRFL}$ pushed the small model ESC-PAN (4, 32, 1) to better reconstruction in terms of maintaining the class information for the facies classifier to recognize. The extreme case of ×8 clearly distinguishes the performance of each method in Table IV.

TABLE IV

Super-Resolution For Facies Classification Results Summary

| Method | Scale | PAc | Class Accuracy | | | | | MCA | FWIU |
|---|---|---|---|---|---|---|---|---|---|
| | | | Zechstein | Scruff | Rijnland/ Chalk | Lower N. S. | Middle N. S. | Upper N. S. | | |
| Original | ×1 | 0.908 | 0.650 | 0.551 | 0.800 | 0.970 | 0.919 | 0.974 | 0.811 | 0.848 |
| Bicubic interpolation | ×2 | 0.907 | 0.646 | 0.536 | 0.801 | 0.971 | 0.919 | 0.975 | 0.808 | 0.847 |
| ESC-PAN (2, 32, 1) | | 0.908 | 0.649 | 0.546 | 0.802 | 0.971 | 0.918 | 0.974 | 0.810 | 0.848 |
| ESC-PAN (2, 32, 1)-$\mathcal{L}^{SRFL}$ | | 0.908 | 0.647 | 0.546 | 0.803 | 0.971 | 0.917 | 0.974 | 0.810 | 0.848 |
| ESC-PAN (2, 64, 10) | | 0.908 | 0.649 | 0.546 | 0.803 | 0.971 | 0.918 | 0.974 | 0.810 | 0.848 |
| ESC-PAN (2, 64, 10)-$\mathcal{L}^{SRFL}$ | | 0.908 | 0.649 | 0.546 | 0.803 | 0.971 | 0.917 | 0.974 | 0.810 | 0.848 |
| Bicubic interpolation | ×4 | 0.859 | 0.582 | 0.342 | 0.852 | 0.983 | 0.794 | 0.858 | 0.735 | 0.770 |
| ESC-PAN (4, 32, 1) | | 0.878 | 0.584 | 0.390 | 0.847 | 0.986 | 0.843 | 0.899 | 0.758 | 0.800 |
| ESC-PAN (4, 32, 1)-$\mathcal{L}^{SRFL}$ | | 0.894 | 0.613 | 0.408 | 0.834 | 0.983 | 0.888 | 0.951 | 0.779 | 0.830 |
| ESC-PAN (4, 64, 10) | | 0.894 | 0.590 | 0.398 | 0.846 | 0.983 | 0.893 | 0.952 | 0.777 | 0.830 |

TABLE IV-continued

Super-Resolution For Facies Classification Results Summary

| Method | Scale | PAc | Class Accuracy | | | | | | MCA | FWIU |
|---|---|---|---|---|---|---|---|---|---|---|
| | | | Zechstein | Scruff | Rijnland/Chalk | Lower N. S. | Middle N. S. | Upper N. S. | | |
| ESC-PAN (4, 64, 10)-$\mathcal{L}^{SRFL}$ | | 0.897 | 0.608 | 0.397 | 0.838 | 0.982 | 0.897 | 0.963 | 0.781 | 0.835 |
| Bicubic interpolation | ×8 | 0.616 | 0.533 | 0.129 | 0.778 | 0.917 | 0.123 | 0.314 | 0.466 | 0.441 |
| ESC-PAN (8, 32, 1) | | 0.587 | 0.116 | 0.074 | 0.702 | 0.968 | 0.145 | 0.140 | 0.357 | 0.377 |
| ESC-PAN (8, 32, 1)-$\mathcal{L}^{SRFL}$ | | 0.858 | 0.582 | 0.312 | 0.695 | 0.960 | 0.838 | 0.944 | 0.722 | 0.773 |
| ESC-PAN (8, 64, 10) | | 0.781 | 0.337 | 0.164 | 0.833 | 0.985 | 0.581 | 0.699 | 0.600 | 0.643 |
| ESC-PAN (8, 64, 10)-$\mathcal{L}^{SRFL}$ | | 0.870 | 0.587 | 0.309 | 0.751 | 0.968 | 0.843 | 0.963 | 0.737 | 0.792 |

The ESC-PAN (8, 32, 1) is trained only on SR, drops in performance significantly, and performs even worse than bicubic interpolation. This can be seen in block 845, where the zoomed-in patch has no information about the boundary between the three classes, namely; Lower N. S., Scruff, and Zechstein. The Middle N. S. classification accuracy in bicubic interpolation and models trained on SR only, because the downsampling process almost completely removed Middle N. S. class. The ×8 case clearly shows the advantage of learning contextual and spatial information by training with $\mathcal{L}^{SRFL}$. This improvement is 27.1% in MCA, and almost 35.1% in FWIU when comparing bicubic interpolation with ESC-PAN (8, 64, 10)-$\mathcal{L}^{SRFL}$. Furthermore, note the significant improvement in Upper and Middle N. S. classes when training with $\mathcal{L}^{SRFL}$ in both models. It is worthy to mention that with only using 2% of the available information in the seismic section, ESC-PAN (8, 64, 10)-$\mathcal{L}^{SRFL}$ produced results that are shy 7.4% in MCA, and shy 5.6% in FWIU when compared to using ground truth sections as input to the facies classifier.

Figure 12:
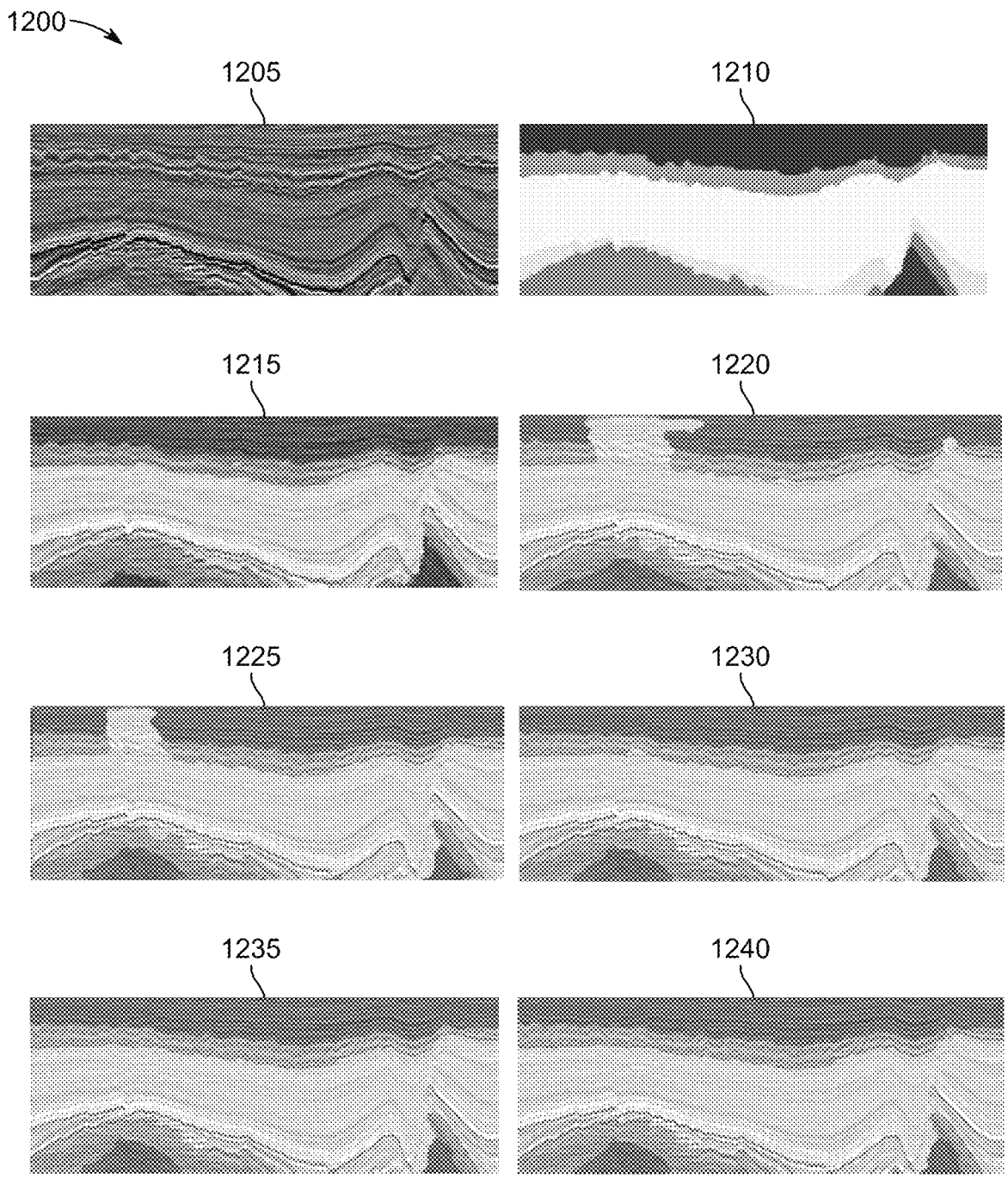
FIG. 12 illustrates samples for facies classification for seismic image super-resolution for scale ×4, according to aspects of the present disclosure.

FIG. 12 illustrates samples 1200 for facies classification for seismic image super-resolution for scale ×4. FIG. 12 illustrates the classification maps considering each input for the case of ×4 degradation. The original seismic section and the ground truth labels are shown in block 1205 and block 1210, respectively. For the remaining blocks (1215-1240), the label map is overlayed on the original ground truth seismic section similar to FIG. 11. Block 1215 shows the output of the classifier given a ground truth image, which performs well. However, there are areas with misclassification, such as in the lower left Scruff portion. This misclassification is further exacerbated in the bicubic case in block 1220 and in blocks 1225 where the small model are trained only on SR. In block 1220, it can be seen that bicubic reconstruction causes wrong labeling as seen in the gap on the top left corner of the seismic section, where Lower N. S. is classified over Middle and Upper N. S. classes. The error in this gap is most likely due to the smooth reconstruction of bicubic interpolation, as there exists a discontinuity that is smoothed out. It can be seen that the error started diagonally in the same line as the discontinuity. A result from ESC-PAN(4, 32, 1), as shown in block 1225, also suffers from the same error gap between Middle and Upper N. S. classes, which is similar to the bicubic case in terms of its occurrence after the discontinuity. However, when using $\mathcal{L}^{SRFL}$ to train ESC-PAN(4, 32, 1), as per results shown in block 1230, this misclassification is corrected. Furthermore, in the small area on the left to Zechstein where there exists Scruff, bicubic interpolation and models trained only on SR almost remove Scruff altogether. On the other hand, when training with $\mathcal{L}^{SRFL}$ this small Scruff class is classified correctly similar to the original classification in block 1215. In the case of ESC-PAN(4, 64, 10) in block 1235, the model is complex enough to deal with the task of ×4 SR, and the visual improvement when training with $\mathcal{L}^{SRFL}$ as shown in in block 1240, is not as noticeable as the case of the smaller model in blocks 1225 and 1230.

Figure 13:
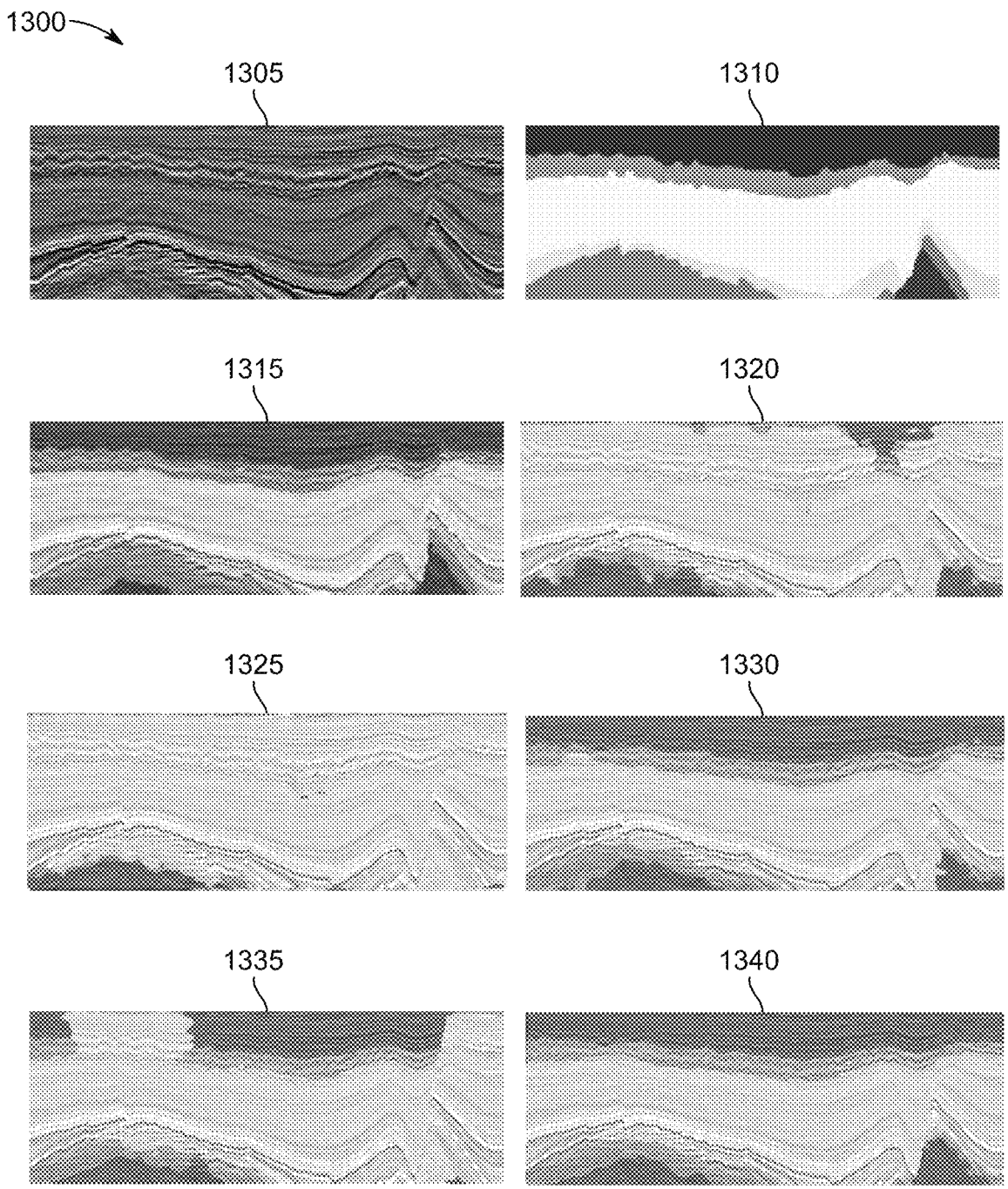
FIG. 13 illustrates samples for facies classification for seismic image super-resolution for scale ×8, according to aspects of the present disclosure.

FIG. 13 illustrates samples 1300 for facies classification for seismic image super-resolution for scale ×8. Block 1305 represents a seismic image corresponding to a ground truth seismic section. Block 1310 represents ground truth labels and block 1315 represents a seismic image obtained using original classification method. For bicubic interpolation as shown in block 1320, the boundary issue in the area between Lower, Middle, and Upper N. S. is apparent. In addition, Zechstein and Rijnland/Chalk appear out of context at the top if the seismic section. Furthermore, the boundary classification between Lower N. S. and Rijnland/Chalk is not as smooth as other methods. This is due to the poor sharpness reconstruction of bicubic interpolation, and even though this smoothness did not translate to facies classification for ×4 SR in block 1220, it is very apparent in this case of ×8 SR. With the facies classification map shown in block 1325, the abysmal accuracy for Zechstein can be explained for ESC-PAN (8, 32, 1), where the model was not able to reconstruct Zechstein in the right side of the section. This can also be attributed to the low number of training samples for Zechstein as seen in Table IV. Furthermore, ESC-PAN (8, 32, 1) classifies the entire section with Lower N. S., which is the most common class in the training data. This is also apparent in the accuracies in Table IV, where the Lower N. S. has an accuracy of 96.8%, and the rest of the classes have an average accuracy of 23.54%. On the other hand, ESC-PAN (8, 64, 10) reconstruction still includes part of the Middle N. S. in block 1335, even though the model was not trained with $\mathcal{L}^{SRFL}$. This again sheds light on the capability of the deeper model in this difficult task. While, ESC-PAN(8, 64, 10) recovered part of Scruff on the left side of the seismic section as shown in block 1335, it still did not classify Zechstein on the right side of the section. Furthermore, ESC-PAN(8, 64, 10) used for block 1335 makes the same error as the bicubic interpolation used in ×4 SR case in block 1220 and ESC-PAN(4, 32, 1) used in block 1225, where part of the seismic section on the top left along the discontinuity is classified with Lower N. S. only. The same can be said for the Lower N. S. error classification along the discontinuity on the right side of the seismic section.

The strong aspects of $\mathcal{L}^{SRFL}$ are very apparent in this case of scale ×8 as shown in block 1330 and block 1340, where Upper, Middle, and Lower N. S. are distinguished with respectable accuracies. In addition, Zechstein is reconstructed on the right side along with a small portion of Scruff that was missing in the bicubic reconstruction in block 1320 and models trained only on SR in block 1325 and block 1335. For results from ESC-PAN(8, 32, 1)-$\mathcal{L}^{SRFL}$ as shown in block 1330, there is small portions of misclassification on the top right corner that does not exist in results from ESC-PAN(8, 64, 10)-$\mathcal{L}^{SRFL}$, as shown in block 1340. TABLE V represents performance of the SRFL SR model.

a seismic image processed by an ESC-PAN (4, 64, 10)-$\mathcal{L}^{SRFL}$ model having PSNR=27.44 dB and SSIM=0.840 and block 1460 illustrates an enlarged view of a selected portion of the block 1465.

When comparing both cases of training ESC-PAN (4, 32, 1), it can be observed that training with $\mathcal{L}^{SRFL}$ in block 1445 produces marginally higher PSNR, but with less SSIM. The visual differences between the two cases are almost indis-

TABLE V

Seismic image SR objective evaluation results summary for scales ×2, ×4, and ×8 when training with SRFL.

| Method | Scale | Valid Set #1 PNSR | Valid Set #1 SSIM | Valid Set #2 PNSR | Valid Set #2 SSIM | Test Set #1 PNSR | Test Set #1 SSIM | Test Set #2 PNSR | Test Set #2 SSIM |
|---|---|---|---|---|---|---|---|---|---|
| Bicubic interpolation | ×2 | 37.04 | 0.9849 | 39.11 | 0.9856 | 37.91 | 0.9865 | 37.78 | 0.9826 |
| ESC-PAN (2, 32, 1) | | 41.06 | 0.9931 | 42.03 | 0.9921 | 40.75 | 0.9926 | 40.52 | 0.9896 |
| ESC-PAN (2, 32,1)-$\mathcal{L}^{SRFL}$ | | 41.49 | 0.9933 | 42.33 | 0.9922 | 41.14 | 0.9927 | 40.85 | 0.9897 |
| ESC-PAN (2, 64, 10) | | 42.32 | 0.9938 | 42.65 | 0.9925 | 42.18 | 0.9932 | 41.15 | 0.9901 |
| ESC-PAN (2, 64, 10)-$\mathcal{L}^{SRFL}$ | | 42.08 | 0.9936 | 42.52 | 0.9924 | 41.78 | 0.9930 | 41.05 | 0.9900 |
| Bicubic interpolation | ×4 | 23.27 | 0.6840 | 25.01 | 0.6903 | 23.44 | 0.6829 | 24.77 | 0.7102 |
| ESC-PAN (4, 32, 1) | | 26.14 | 0.8084 | 27.16 | 0.7943 | 26.05 | 0.7934 | 26.38 | 0.7792 |
| ESC-PAN (4, 32,1)-$\mathcal{L}^{SRFL}$ | | 25.84 | 0.8012 | 26.91 | 0.7894 | 25.78 | 0.7868 | 26.16 | 0.7745 |
| ESC-PAN (4, 64, 10) | | 27.59 | 0.8535 | 28.31 | 0.8335 | 26.78 | 0.8209 | 26.95 | 0.8001 |
| ESC-PAN (4, 64, 10)-$\mathcal{L}^{SRFL}$ | | 26.99 | 0.8391 | 27.65 | 0.8192 | 26.40 | 0.8062 | 26.52 | 0.7861 |
| Bicubic interpolation | ×8 | 17.98 | 0.3565 | 20.05 | 0.4036 | 18.22 | 0.3508 | 19.58 | 0.4023 |
| ESC-PAN (8, 32, 1) | | 21.36 | 0.5798 | 23.14 | 0.6046 | 21.47 | 0.5650 | 22.36 | 0.5769 |
| ESC-PAN (8, 32, 1)-$\mathcal{L}^{SRFL}$ | | 20.70 | 0.5326 | 22.29 | 0.5626 | 20.79 | 0.5154 | 21.54 | 0.5270 |
| ESC-PAN (8, 64, 10) | | 22.86 | 0.6808 | 23.91 | 0.6660 | 22.11 | 0.6200 | 22.77 | 0.6139 |
| ESC-PAN (8, 64, 10)-$\mathcal{L}^{SRFL}$ | | 21.77 | 0.6201 | 23.19 | 0.6289 | 21.59 | 0.5821 | 22.16 | 0.5761 |

The SR performance of ESC-PAN (r, 32, 1)-$\mathcal{L}^{SRFL}$ and ESCPAN (r, 64, 10)-$\mathcal{L}^{SRFL}$ was studied during the experimentation of the present disclosure. Objective and subjective IQA were compared with the same model without training on $\mathcal{L}^{SRFL}$. Table V summarizes PSNR and SSIM scores for all models and all training approaches. From the results, it is clear that when the model is trained with $\mathcal{L}^{SRFL}$, the PSNR and SSIM scores degrade fair amounts. The only exception to this is ESC-PAN (2, 32, 1)-$\mathcal{L}^{SRFL}$, where $\mathcal{L}^{SRFL}$ actually provided better SR objective scores. However, scale ×2 is quite an easy task, especially for seismic images, and all models perform well with high SR objective scores.

Figure 14:
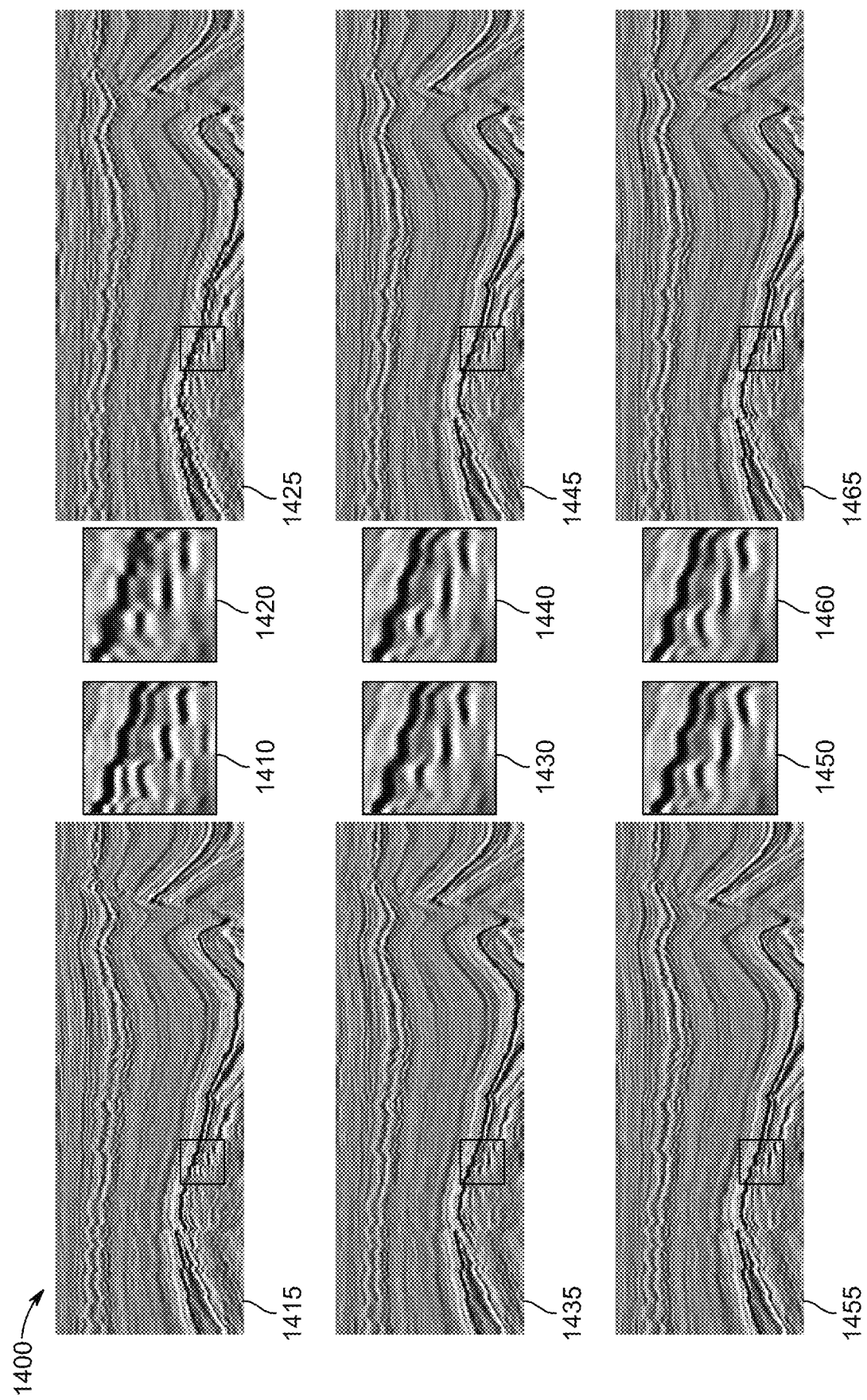
FIG. 14 illustrates samples for seismic image super-resolution with facies loss for scale ×4, according to aspects of the present disclosure.

FIG. 14 illustrates samples 1400 for seismic image super-resolution with facies loss for scale ×4. FIG. 14 provides visual examples for subjective evaluation of case of ×4 SR. For the scale ×4 case illustrated in FIG. 14, block 1415 illustrates a ground truth (reference binary image) and block 1410 illustrates an enlarged view of a selected portion of the block 1415. Block 1425 illustrates a seismic image processed by the bicubic interpolation having PSNR=23.57 dB and SSIM=0.691 and block 1420 illustrates an enlarged view of a selected portion of the block 1425. Block 1435 illustrates a seismic image processed by the ESC-PAN (4, 32, 1) model having PSNR=26.60 dB and SSIM=0.817 and block 1430 illustrates an enlarged view of a selected portion of the block 1435. Block 1445 illustrates a seismic image processed by an ESC-PAN (4, 32, 1)-$\mathcal{L}^{SRFL}$ model having PSNR=26.26 dB and SSIM=0.810 and block 1440 illustrates an enlarged view of a selected portion of the block 1445. Block 1455 illustrates a seismic image processed by an ESC-PAN (4, 64, 10) model having PSNR=27.59 dB and SSIM=0.849 and block 1450 illustrates an enlarged view of a selected portion of the block 1455. Block 1465 illustrates tinguishable. In the case of ESC-PAN (4, 64, 10), training with $\mathcal{L}^{SRFL}$ produces inferior PSNR and SSIM, but visually, there are minor differences between both training approaches. For both ESC-PAN (4, 32, 1) and ESC-PAN (4, 64, 10), while objective scores are inferior when training with $\mathcal{L}^{SRFL}$ in Table V, the visual differences are unnoticeable. Thus, in this case of ×4 SR, $\mathcal{L}^{SRFL}$ improves facies classification results in Table IV with minimal effects on subjective SR performance.

Figure 15:
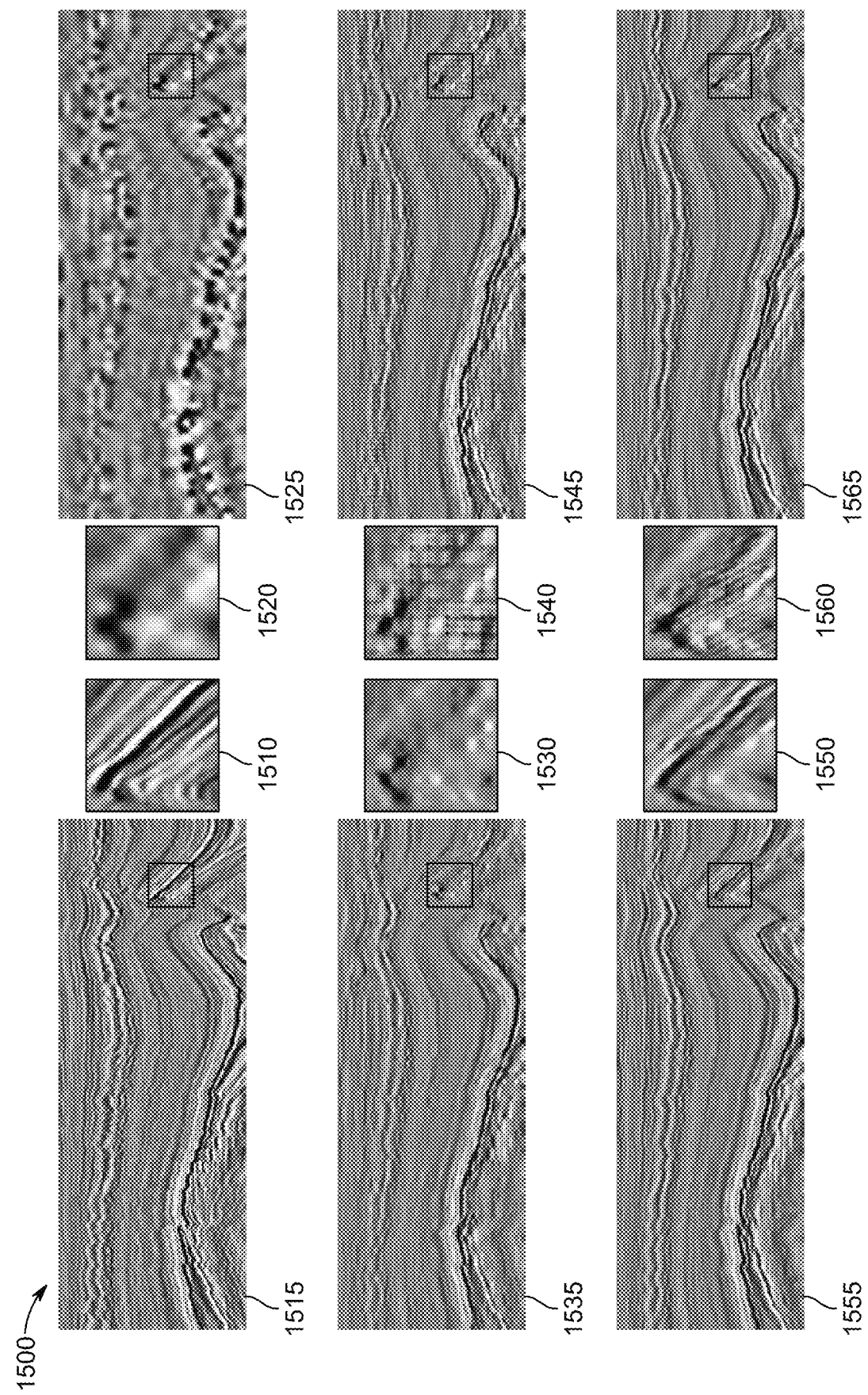
FIG. 15 illustrates samples for seismic image super-resolution with facies loss for scale ×8, according to aspects of the present disclosure.

FIG. 15 illustrates samples 1500 for seismic image super-resolution with facies loss for scale ×8. For the scale ×8 case as illustrated in FIG. 15, block 1515 illustrates a ground truth (reference binary image) and block 1510 illustrates an enlarged view of a selected portion of the block 1515. Block 1525 illustrates a seismic image processed by the bicubic interpolation having PSNR=18.17 dB and SSIM=0.359 and block 1520 illustrates an enlarged view of a selected portion of the block 1525. Block 1535 illustrates a seismic image processed by the ESC-PAN (8, 32, 1) model having PSNR=21.48 dB and SSIM=0.575 and block 1530 illustrates an enlarged view of a selected portion of the block 1535. Block 1545 illustrates a seismic image processed by an ESC-PAN (8, 32, 1)-$\mathcal{L}^{SRFL}$ model having PSNR=20.70 dB and SSIM=0.520 and block 1540 illustrates an enlarged view of a selected portion of the block 1545. Block 1555 illustrates a seismic image processed by an ESC-PAN (8, 64, 10) model having PSNR=22.71 dB and SSIM=0.664 and block 1550 illustrates an enlarged view of a selected portion of the block 1555. Block 1565 illustrates a seismic image processed by an ESC-PAN (8, 64, 10)-$\mathcal{L}^{SRFL}$ model having PSNR=21.61 dB and SSIM=0.602 and block 1560 illustrates an enlarged view of a selected portion of the block 1565.

In FIG. 15, visual results are provided for ×8 SR. It can be observed that there are increased blocking artifacts when training with $\mathcal{L}^{SRFL}$ for in block 1545 and block 1565. This is more present in ESC-PAN (8, 32, 1) in block 1545, and this can be attributed to the limited capability of the model. Furthermore, blocking artifacts can be found at the boundary between Upper N. S. and Middle N. S. classes in block 1545. This could be because the SR model is trying to emphasize a boundary there due to awareness to the class context in that area. However, for ESC-PAN (8, 64, 10)-$\mathcal{L}^{SRFL}$ in block 1565, the blocking artifacts are reduced significantly, as ESC-PAN (8, 64, 10) is a more capable model. Similar observation can be highlighted in the zoomed-in patch on the right side of the seismic section, where Zechstein, Scruff, Rijnland/Chalk, and Lower N. S. classes are present, and blocking artifacts are all over. On the other hand, the middle part of the seismic section, in both blocks 1545 and 1565, has no blocking artifacts, since this area includes one class only, the Lower N. S., and no edge boundary exists there.

Figure 16:
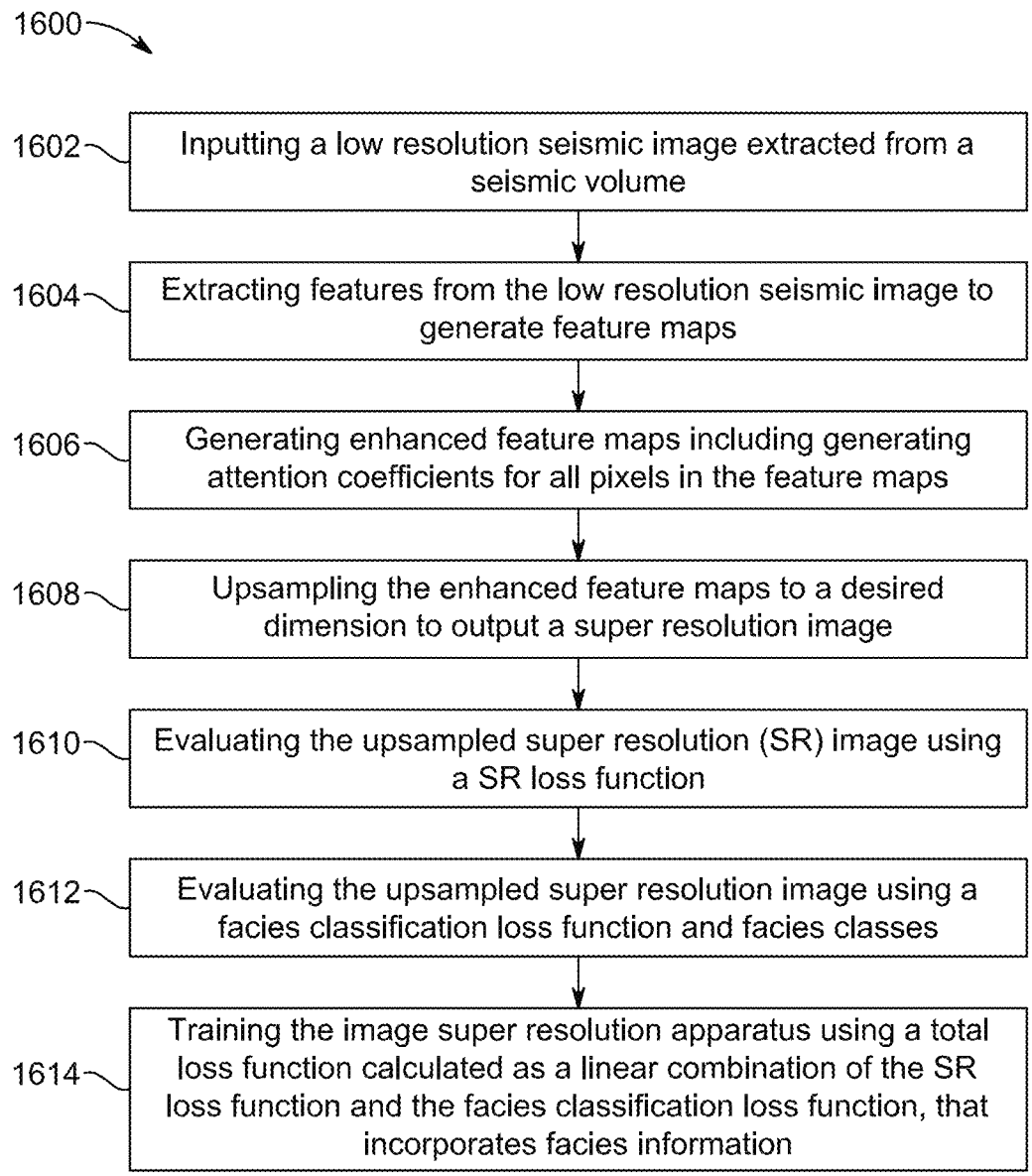
FIG. 16 illustrates a method of training an image super-resolution apparatus for facies classification, according to aspects of the present disclosure.

FIG. 16 illustrates a method 1600 of training an image super-resolution apparatus for facies classification, according to aspects of the present disclosure.

Step 1602 includes inputting a low resolution seismic image extracted from a seismic volume.

Step 1604 includes extracting features from the low resolution seismic image to generate feature maps.

Step 1606 includes generating enhanced feature maps including generating attention coefficients for all pixels in the feature maps.

Step 1608 includes upsampling the enhanced feature maps to a desired dimension to output a super resolution image.

Step 1610 includes evaluating the upsampled super resolution (SR) image using a SR loss function.

Step 1612 includes evaluating the upsampled super resolution image using a facies classification loss function and facies classes.

Step 1614 includes training the image super resolution apparatus using a total loss function calculated as a linear combination of the SR loss function and the facies classification loss function, which incorporates facies information. In an aspect, the SR loss function is a pixel-level loss relative to a high resolution ground truth image.

In the present disclosure, the F3 block is adopted as the dataset used for seismic image super-resolution. The dataset was split into five smaller datasets, one for training, two for validation, and two for testing. This splitting aims to reduce the correlation between the training and testing datasets. The validation datasets act as a separator between training and testing datasets while being correlated to both. To counter the issue of having limited data, a variable patch size training approach is employed. Further, two versions of the adopted SR model, ESC-PAN, are used. Both SR models are compared with the conventional bicubic interpolation and similar complexity SR models from the literature. The deeper version of ESC-PAN was able to reconstruct seismic sections with the extreme case of ×8 with close resemblance to the ground truth. A seismic interpretation task is used to further validate the reconstruction quality of the super-resolution model, namely; facies classification. The present disclosure envisages a super-resolution facies loss function to provide the SR model facies information when upsampling. Facies classification results were improved when using the disclosed super-resolution facies loss function with minimal losses in super-resolution performance.

Further, to improve the performance of the present apparatus, the super-resolution facies loss is used for incorporating other information for the super-resolution model when training. Fault information in the subsurface can allow the SR-CNN model to reconstruct the image even better. In addition, subsurface structure interpretation is another important seismic interpenetration task that can guide the super-resolution model for better reconstruction.

The present disclosure is configured to provide real-time image super-resolution that increases the performance of digital image processing techniques. The present disclosure is employable in modern digital communication that includes many applications that generate data in the form of images and videos. The present disclosure is applicable to a wide range of applications that require real-time operation, including satellite image processing, medical image processing, microscopy image processing, the multimedia industry, video enhancement, and astrological studies. The present disclosure is configured to be employed in a system related to surveillance to detect, identify, and perform facial recognition on low-resolution images obtained from security cameras to enhance the accuracy of the system.

As the real-time image super-resolution is capable of reducing server costs, the present apparatus is deployable in various applications related to media where files can be sent at a lower resolution and upscaled on the other end. Aside from this application, the present disclosure could be used in object detection, the automotive industry, real-time processing, scanning, surveillance, military, and forensics. In one sense, the current disclosure is useful in areas that require extremely high resolution images, such as 4K, 8K, and so on.

A first embodiment is illustrated with respect to FIG. 1-FIG. 16. The first embodiment describes the seismic image super-resolution apparatus 200. The apparatus 200 includes the input 205 for inputting a low resolution seismic image extracted from a seismic volume, a processor 210 incorporated with a machine learning processing unit 215, the machine learning processing unit 215 performing a super-resolution (SR) convolution neural network (CNN) model 220 including: a processing unit input 225 for receiving the low resolution seismic image, a feature extraction section 230, a non-linear feature mapping section 245 having a self-calibrated block with pixel attention 250, in which all convolution layers are Depthwise Separable Convolution (DSC) layers 255, an upsampling section 270 having a connection that upsamples to a desired scale, and an output 275 for displaying an approximate upsampled super-resolution seismic image that corresponds to the low resolution seismic image, with a desired scale of at least two times the low resolution seismic image.

In an aspect of the present disclosure, the non-liner mapping section 245 includes a parametric rectified linear unit activation function for each DSC layer.

In an aspect of the present disclosure, the Depthwise Separable Convolution 255 includes a depthwise convolution 260 and a pointwise convolution 265.

In an aspect of the present disclosure, the feature extraction section 230 includes a convolution layer 235 and a parametric rectified linear unit activation function 240.

The second embodiment is illustrated with respect to FIG. 1-FIG. 16. The second embodiment describes the method of training an image super-resolution apparatus for facies classification. The method includes inputting a low resolution seismic image extracted from a seismic volume. The method further includes extracting features from the low resolution seismic image to generate feature maps. The method further includes generating enhanced feature maps including generating attention coefficients for all pixels in the feature maps. The method further includes upsampling the enhanced feature maps to a desired dimension to output a super resolution image. The method further includes evaluating the upsampled super resolution (SR) image using a SR loss function. The method further includes evaluating the upsampled super resolution image using a facies classification loss function and facies classes. The method further includes training the image super resolution apparatus using a total loss function calculated as a linear combination of the SR loss function and the facies classification loss function, that incorporates facies information.

In an aspect of the present disclosure, the SR loss function is a pixel-level loss relative to a high resolution ground truth image.

In an aspect of the present disclosure, the facies classification loss function is a cross-entropy loss function based on a predicted model label relative to a respective ground truth label.

Figure 17:
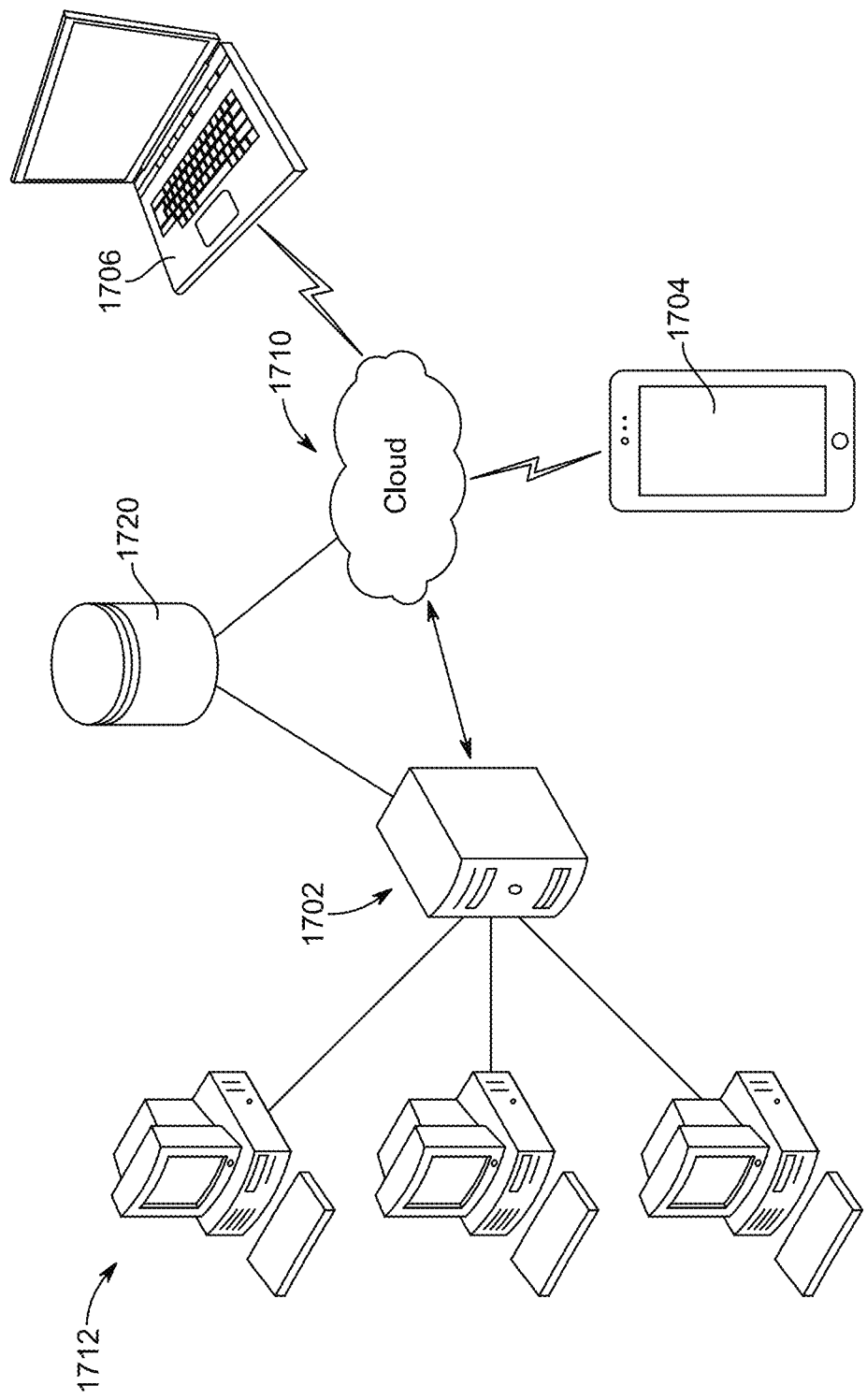
FIG. 17 is a diagram of a machine learning system, according to aspects of the present disclosure.

FIG. 17 is a diagram of a machine learning system, according to certain embodiments. In an exemplary embodiment, a server 1702 or artificial intelligence (AI) workstation may be configured for generation of super-resolution images. With such a configuration, one or more client computers 1712 may be used to perform generation of super-resolution images at a time. In the embodiment, the server 1702 may be connected to a cloud service 1710. The cloud service 1710 may be accessible via the Internet. The cloud service 1710 may provide a database system and may store seismic images. Mobile devices 1704, 1706 may access the seismic images stored in the cloud service 1710.

Next, further details of the hardware description of the computing environment of FIG. 2 according to exemplary embodiments is described with reference to FIG. 18.

Figure 18:
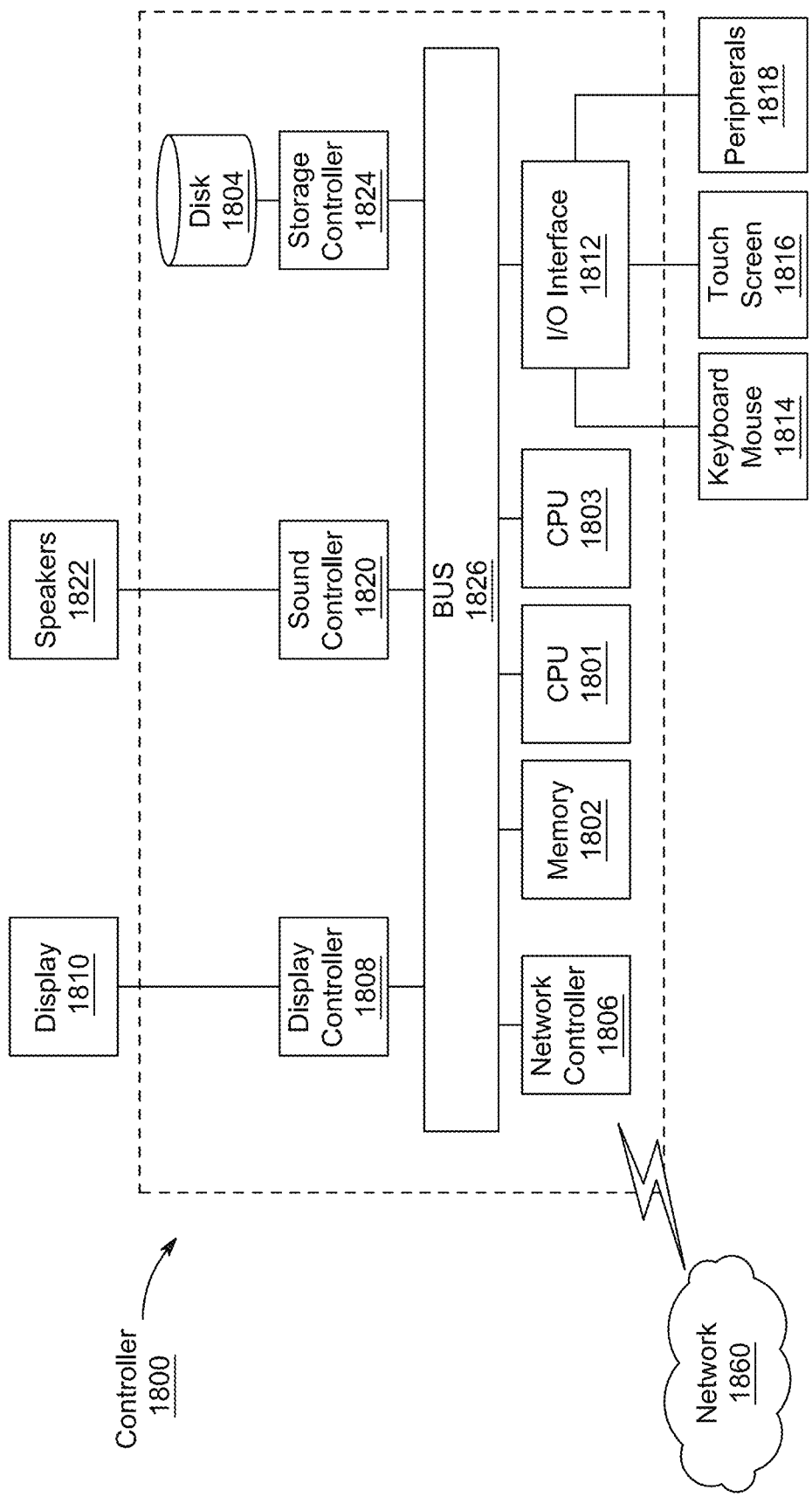
FIG. 18 is an illustration of a non-limiting example of details of computing hardware used in the computing system, according to aspects of the present disclosure.

In FIG. 18, a controller 1800 is described is representative of the apparatus 200 of FIG. 2 in which the controller is a computing device which includes a CPU 1801 which performs the processes described above/below.

FIG. 18 is an illustration of a non-limiting example of details of computing hardware used in the computing system, according to exemplary aspects of the present disclosure. In FIG. 18, a controller 1800 is described which is a computing device (that includes, the input 205, and the CNN model 220) and includes a CPU 1801 which performs the processes described above/below. The process data and instructions may be stored in memory 1802. These processes and instructions may also be stored on a storage medium disk 1804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1801, 1803 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 1801 or CPU 1803 may be a Xenon or Core processor from Intel of America or an Opteron processor from AMD of America, or may be other processor types that would be recognized by one of ordinary skill in the art. Alternatively, the CPU 1801, 1803 may be implemented on an FPGA, ASIC, PLD or using discrete logic circuits, as one of ordinary skill in the art would recognize. Further, CPU 1801, 1803 may be implemented as multiple processors cooperatively working in parallel to perform the instructions of the inventive processes described above.

The computing device in FIG. 18 also includes a network controller 1806, such as an Intel Ethernet PRO network interface card from Intel Corporation of America, for interfacing with network 1860. As can be appreciated, the network 1860 can be a public network, such as the Internet, or a private network such as an LAN or WAN network, or any combination thereof and can also include PSTN or ISDN sub-networks. The network 1860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1808, such as a NVIDIA GeForce GTX or Quadro graphics adaptor from NVIDIA Corporation of America for interfacing with display 1810, such as a Hewlett Packard HPL2445w LCD monitor. A general purpose I/O interface 1812 interfaces with a keyboard and/or mouse 1814 as well as a touch screen panel 1816 on or separate from display 1810. General purpose I/O interface also connects to a variety of peripherals 1818 including printers and scanners, such as an OfficeJet or DeskJet from Hewlett Packard.

A sound controller 1820 is also provided in the computing device such as Sound Blaster X-Fi Titanium from Creative, to interface with speakers/microphone 1822 thereby providing sounds and/or music.

The general-purpose storage controller 1824 connects the storage medium disk 1804 with communication bus 1826, which may be an ISA, EISA, VESA, PCI, or similar, for interconnecting all of the components of the computing device. A description of the general features and functionality of the display 1810, keyboard and/or mouse 1814, as well as the display controller 1808, storage controller 1824, network controller 1806, sound controller 1820, and general purpose I/O interface 1812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 19.

Figure 19:
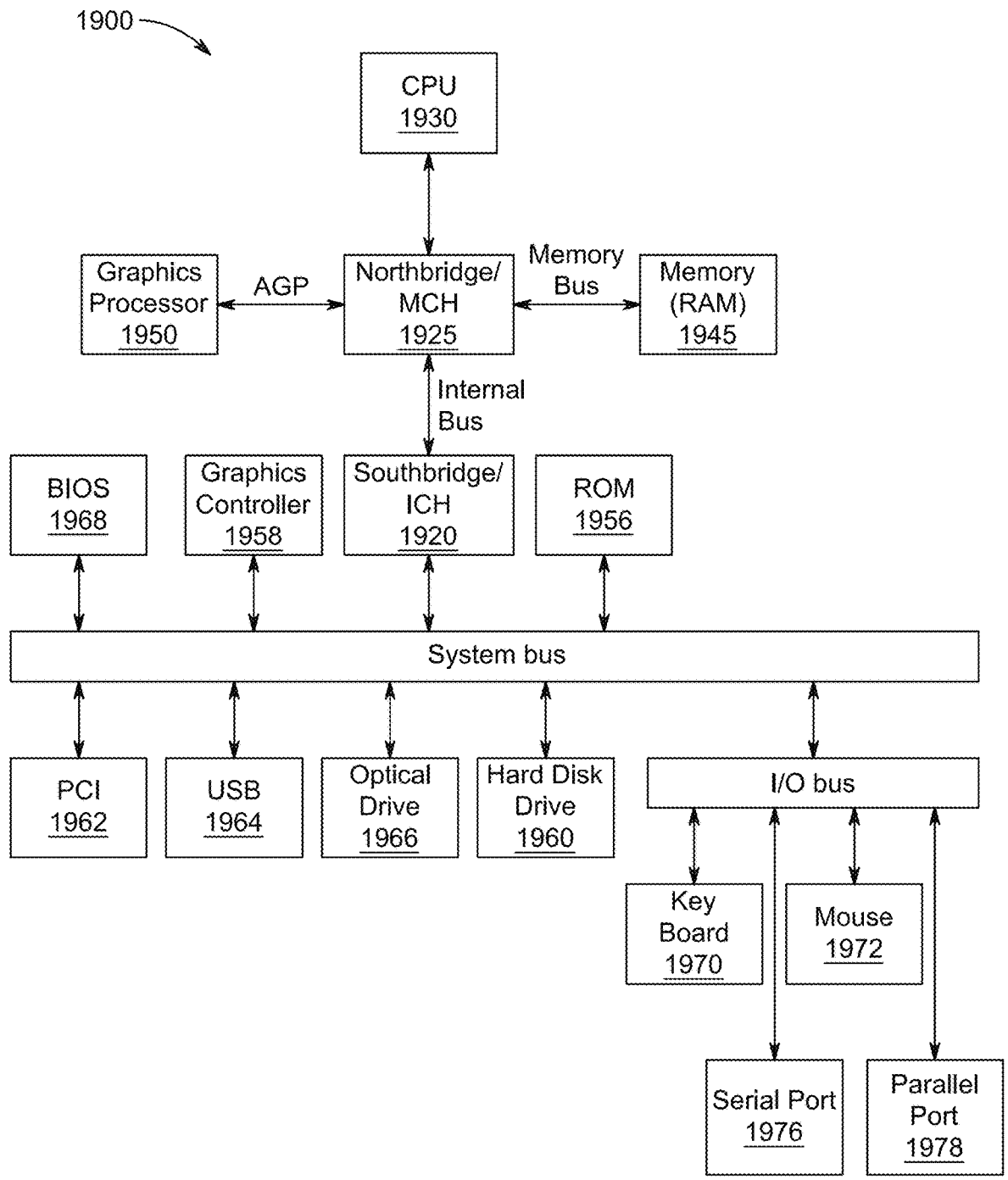
FIG. 19 is an exemplary schematic diagram of a data processing system used within the computing system, according to aspects of the present disclosure.

FIG. 19 shows a schematic diagram of a data processing system 1900 used within the computing system, according to exemplary aspects of the present disclosure. The data processing system 1900 is an example of a computer in which code or instructions implementing the processes of the illustrative aspects of the present disclosure may be located.

In FIG. 19, data processing system 1980 employs a hub architecture including a north bridge and memory controller hub (NB/MCH) 1925 and a south bridge and input/output (I/O) controller hub (SB/ICH) 1920. The central processing unit (CPU) 1930 is connected to NB/MCH 1925. The NB/MCH 1925 also connects to the memory 1945 via a memory bus, and connects to the graphics processor 1950 via an accelerated graphics port (AGP). The NB/MCH 1925 also connects to the SB/ICH 1920 via an internal bus (e.g., a unified media interface or a direct media interface). The CPU Processing unit 1930 may contain one or more processors and even may be implemented using one or more heterogeneous processor systems.

Figure 20:
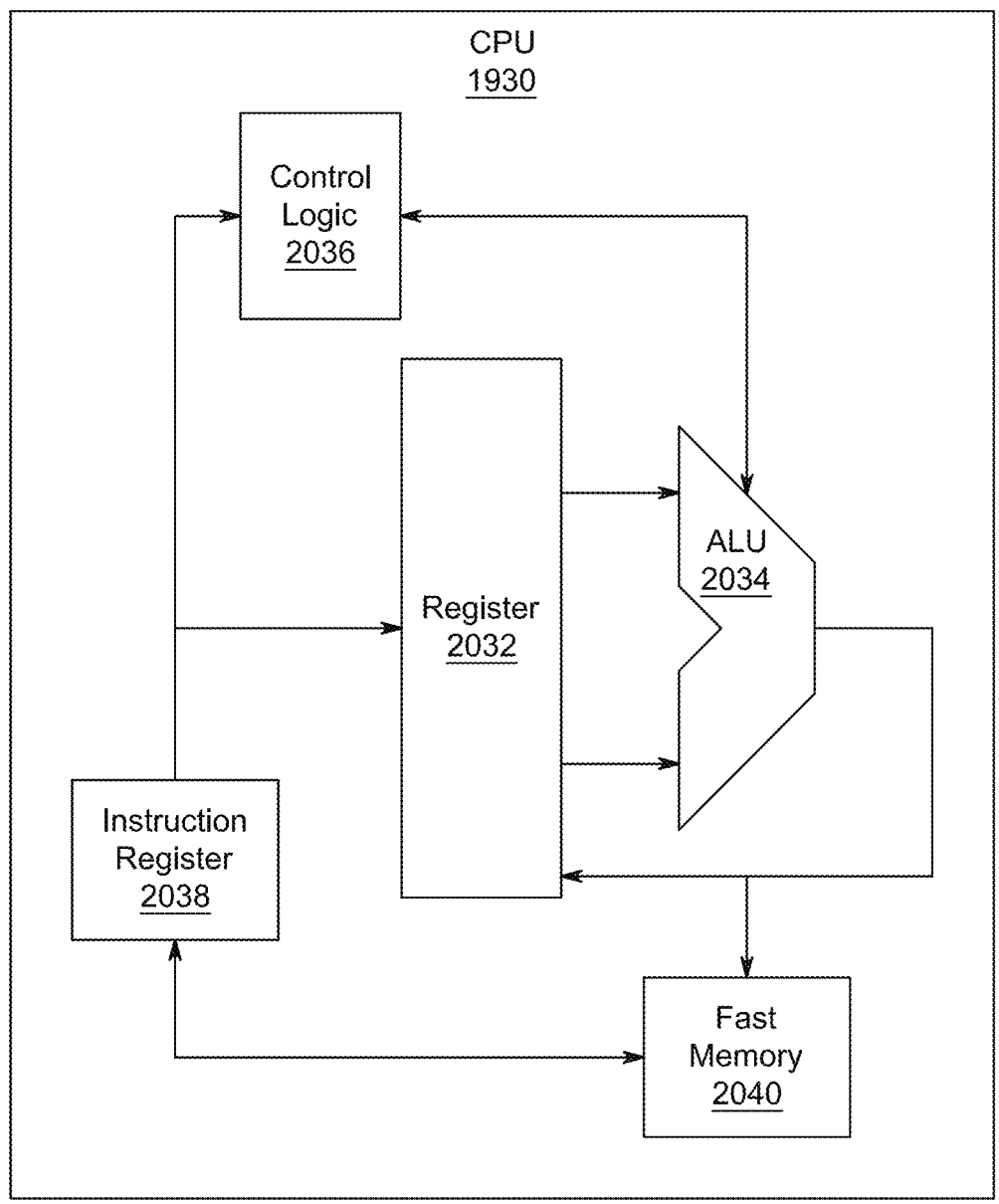
FIG. 20 is an exemplary schematic diagram of a processor used with the computing system, according to aspects of the present disclosure.

For example, FIG. 20 shows one aspects of the present disclosure of CPU 1930. In one aspects of the present disclosure, the instruction register 2038 retrieves instructions from the fast memory 2040. At least part of these instructions is fetched from the instruction register 2038 by the control logic 2036 and interpreted according to the instruction set architecture of the CPU 1930. Part of the instructions can also be directed to the register 2032. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 2034 that loads values from the register 2032 and performs logical and mathematical operations on the loaded values according to the instructions. The results from these operations can be feedback into the register and/or stored in the fast memory 2040. According to certain aspects of the present disclosures, the instruction set architecture of the CPU 1930 can use a reduced instruction set architecture, a complex instruction set architecture, a vector processor architecture, a very large instruction word architecture. Furthermore, the CPU 1930 can be based on the Von Neuman model or the Harvard model. The CPU 1930 can be a digital signal processor, an FPGA, an ASIC, a PLA, a PLD, or a CPLD. Further, the CPU 1930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 19, the data processing system 1980 can include that the SB/ICH 1920 is coupled through a system bus to an I/O Bus, a read only memory (ROM) 1956, universal serial bus (USB) port 1964, a flash binary input/output system (BIOS) 1968, and a graphics controller 1958. PCI/PCIe devices can also be coupled to SB/ICH 1920 through a PCI bus 1962.

The PCI devices may include, for example, Ethernet adapters, add-in cards, and PC cards for notebook computers. The Hard disk drive 1960 and CD-ROM 1956 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1960 and optical drive 1966 can also be coupled to the SB/ICH 1920 through a system bus. In one aspects of the present disclosure, a keyboard 1970, a mouse 1972, a parallel port 1978, and a serial port 1976 can be connected to the system bus through the I/O bus. Other peripherals and devices that can be connected to the SB/ICH 1920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 21:
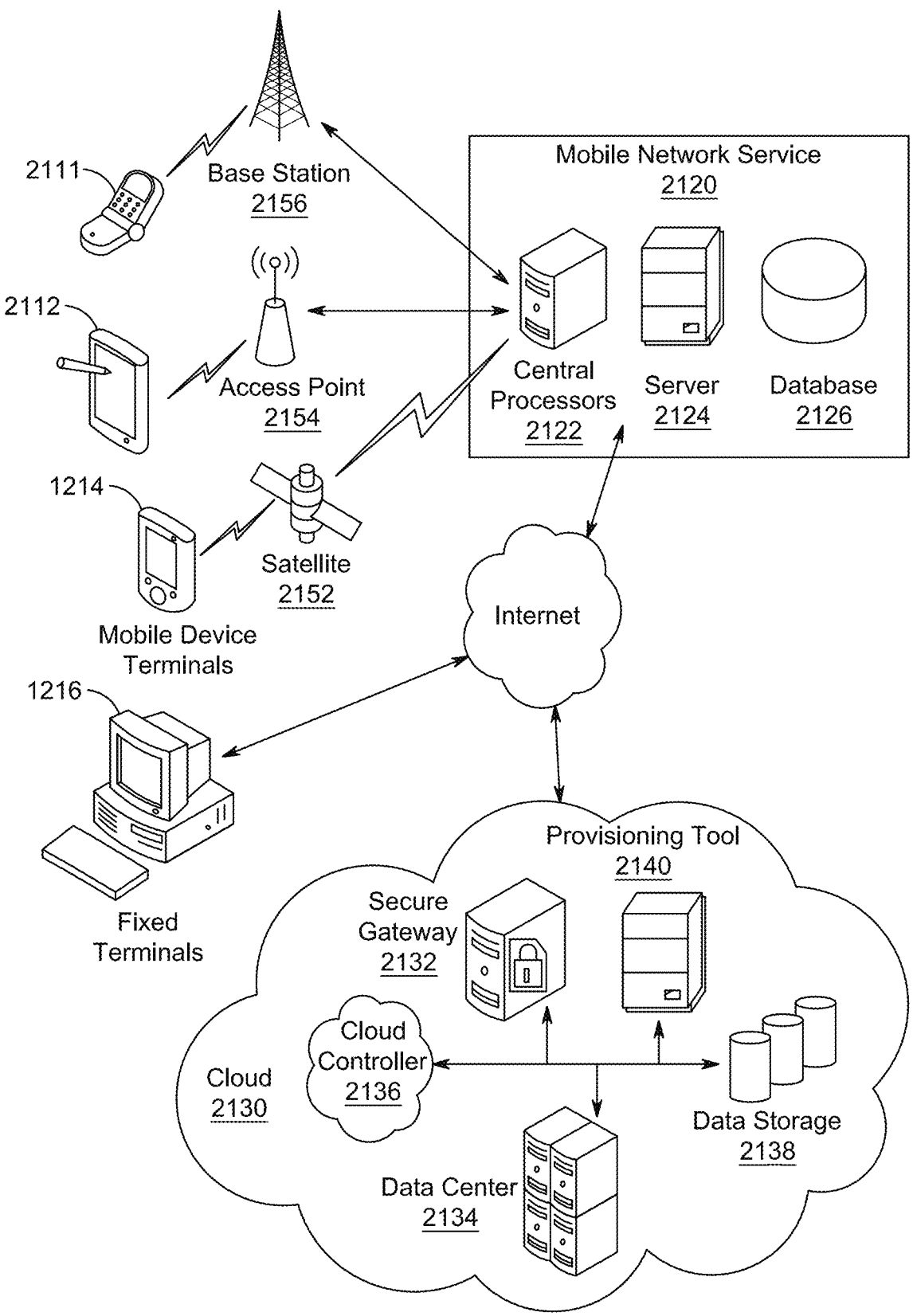
FIG. 21 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 21, in addition to various human interface and communication devices (e.g., display monitors, smart phones, tablets, personal digital assistants (PDAs)). More specifically, FIG. 21 illustrates client devices including smart phone 2111, tablet 2112, mobile device terminal 2114 and fixed terminals 2116. These client devices may be commutatively coupled with a mobile network service 2120 via base station 2156, access point 2154, satellite 2152 or via an internet connection. Mobile network service 2120 may comprise central processors 2122, server 2124 and database 2126. Fixed terminals 2116 and mobile network service 2120 may be commutatively coupled via an internet connection to functions in cloud 2130 that may comprise security gateway 2132, data center 2134, cloud controller 2136, data storage 2138 and provisioning tool 2140. The network may be a private network, such as a LAN or WAN, or may be a public network, such as the Internet. Input to the system may be received via direct user input and received remotely either in real-time or as a batch process. Additionally, some aspects of the present disclosure may be performed on modules or hardware not identical to those described.

In an aspect, the present disclosure is configured on a Lambda workstation. The Lambda workstation is a special purpose workstation for high performance computing, such as Machine Learning. In one embodiment, the Lambda workstation is configured with AMD Ryzen Threadripper 3960X 24-core processor, 64 GB RAM, NVIDIA GeForce RTX 3090 GPU, running Ubuntu operating system, and PyTorch.

Figure 22:
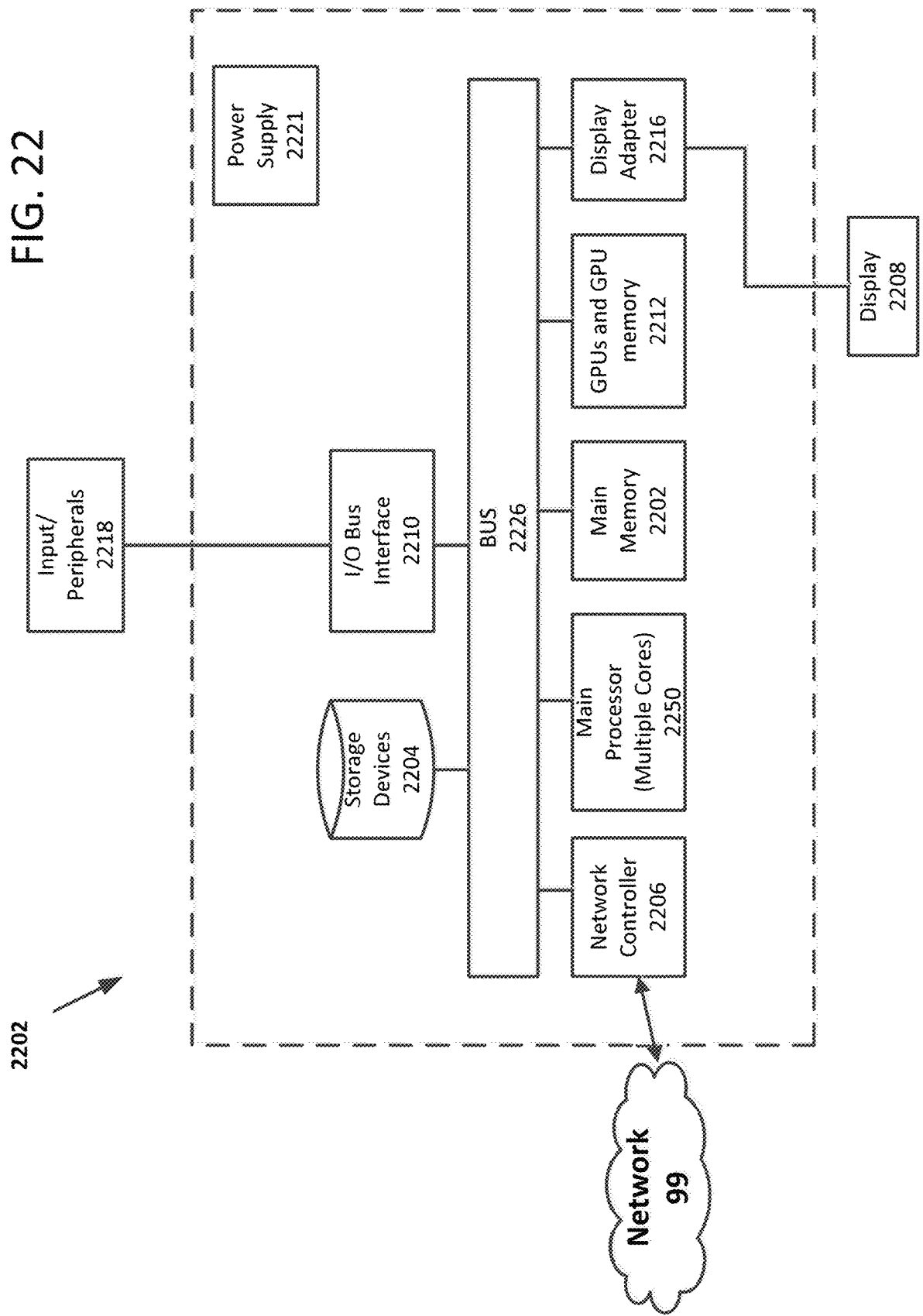
FIG. 22 is a block diagram of an AI workstation, according to aspects of the present disclosure.

FIG. 22 is a block diagram illustrating an example computer system, such as a Lambda workstation or the like, for implementing the machine learning training and inference methods according to an exemplary aspect of the disclosure. The computer system may be an AI workstation running an operating system, for example Ubuntu Linux OS, Windows, a version of Unix OS, or Mac OS. The computer system 2200 may include one or more central processing units (CPU) 2250 having multiple cores. The computer system 2200 may include a graphics board 2212 having multiple GPUs, each GPU having GPU memory, or an integrated GPU. The graphics board 2212 or integrated GPU may perform many of the mathematical operations of the disclosed machine learning methods. The computer system 2200 includes main memory 2202, typically random access memory RAM, which contains the software being executed by the processing cores 2250 and GPUs 2212, as well as a non-volatile storage device 2204 for storing data and the software programs. Several interfaces for interacting with the computer system 2200 may be provided, including an I/O Bus Interface 2210, Input/Peripherals 2218 such as a keyboard, touch pad, mouse, Display Adapter 2216 and one or more Displays 2208, and a Network Controller 2206 to enable wired or wireless communication through a network 99. The interfaces, memory and processors may communicate over the system bus 2226. The computer system 2200 includes a power supply 2221, which may be a redundant power supply.

In some embodiments, the computer system 2200 may include a CPU and a graphics card, in which the GPUs have multiple cores. A non-limiting example graphics card for the computer system 2200 is an NVIDIA GPU, for example, with multiple CUDA cores. In some embodiments, the computer system 2200 may include a System on a Chip configured with a machine learning engine 2212. A non-limiting example of a System on a Chip with a machine learning engine 2212 is the M2, M3 series chips from Apple, as well as System on a Chip configurations available from NVIDIA, including nForce and Tegra series processors.

The above-described hardware description is a non-limiting example of corresponding structure for performing the functionality described herein.

Numerous modifications and variations of the present disclosure are possible in light of the above teachings. It is therefore to be understood that the disclosure may be practiced otherwise than as specifically described herein.

The invention claimed is:

1. A facies classification apparatus, comprising:
processing circuitry for a machine learning engine configured to
receive a low resolution seismic image extracted from a seismic volume;
extract features from the low resolution image;
generate feature maps using a self-calibrated block with pixel attention having a plurality of Depthwise Separable Convolution (DSC) layers;
upsample the feature maps to a predetermined dimension;
display an approximate upsampled super-resolution seismic image that corresponds to the low resolution seismic image, with a desired scale of at least two times the low resolution seismic image;
classify facies in the seismic volume based on the approximate upsampled super-resolution seismic image to obtain one or more class labels; and
display the approximate upsampled super-resolution seismic image and the one or more class labels.

2. The facies classification apparatus of claim 1, wherein the processing circuitry is further configured to learn a parameter of a Parametric Rectified Linear Unit as an activation function.

3. The facies classification apparatus of claim 1, wherein the processing circuitry is further configured to apply an element-wise product to a convolution kernel and to each channel of input features independently and iterate through every point.

4. The facies classification apparatus of claim 1, wherein the processing circuitry is further configured to attain a 3D matrix of attention maps.

5. The facies classification apparatus of claim 1, wherein processing circuitry is further configured to attain a 3D matrix of attention maps.

6. The facies classification apparatus of claim 1, wherein the processing circuitry is further configured to pretrain on entire seismic sections of the seismic images.

7. The facies classification apparatus of claim 1, wherein the processing circuitry is further configured to
calculate a pixel-level loss function for the approximate upsampled super-resolution seismic image;
calculate a facies classification loss function;
calculate a total loss as a combination of the pixel-level loss and the facies classification loss; and
train parameters of the feature extraction section, feature mapping section, and upsampling section based on the total loss.

8. The facies classification apparatus of claim 1, wherein the processing circuitry is further configured to generate a bicubic interpolated image; and
add the bicubic interpolated image to the output to produce a combined super-resolution seismic image.

* * * * *